(12) United States Patent
Shinohara

(10) Patent No.: US 11,816,373 B2
(45) Date of Patent: Nov. 14, 2023

(54) IMAGE FORMING APPARATUS USING SHEET ATTRIBUTE DETERMINATION TO EXECUTE PRINTING, TO DETERMINE WHETHER TO STOP OR CONTINUE PRINTING BASED ON SHEET ATTRIBUTE DETERMINATION AND SHEET STORAGE DESIGNATED AND CONTROL METHOD

(71) Applicant: CANON KABUSHIKI KAISHA, Tokyo (JP)

(72) Inventor: Taku Shinohara, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/511,862

(22) Filed: Oct. 27, 2021

(65) Prior Publication Data

US 2022/0050649 A1    Feb. 17, 2022

Related U.S. Application Data

(62) Division of application No. 16/029,949, filed on Jul. 9, 2018, now abandoned.

(30) Foreign Application Priority Data

Jul. 12, 2017  (JP) ................................. 2017-136441
Jun. 13, 2018  (JP) ................................. 2018-113103

(51) Int. Cl.
*G06F 3/12*    (2006.01)
*H04N 1/23*    (2006.01)
*G06K 15/02*   (2006.01)
*G06K 15/00*   (2006.01)

(52) U.S. Cl.
CPC .......... *G06F 3/1255* (2013.01); *G06F 3/1208* (2013.01); *G06F 3/1235* (2013.01); *G06F 3/1252* (2013.01); *G06K 15/186* (2013.01); *G06K 15/1809* (2013.01); *G06K 15/1823* (2013.01); *G06K 15/4065* (2013.01); *H04N 1/2323* (2013.01)

(58) Field of Classification Search
CPC .... G06F 3/1208; G06F 3/1235; G06F 3/1252; G06F 3/1255; G06K 15/1809; G06K 15/1823; G06K 15/186; G06K 15/4065; H04N 1/2323
USPC ....................... 358/1.2, 1.11–1.18; 399/8–37
See application file for complete search history.

(56) References Cited

U.S. PATENT DOCUMENTS 6,741,269 B2    5/2004  Morikawa
6,775,488 B2    8/2004  Sawada
6,952,542 B1   10/2005  Morikawa
(Continued)

FOREIGN PATENT DOCUMENTS

CN    101470376 A    7/2009
CN    101614980 A   12/2009
(Continued)

*Primary Examiner* — Chad Dickerson
(74) *Attorney, Agent, or Firm* — VENABLE LLP

(57) ABSTRACT

In a case where the printing of a plurality of copies based on an original image is to be executed by causing a feeding stage which is set for each of the plurality of copies to perform feeding, a feed operation is controlled so as to stop feeding from a feeding stage which serves as a feed target when a sheet attribute designated in a job and a sheet attribute set in the feeding stage are different from each other.

6 Claims, 30 Drawing Sheets

(56) References Cited

U.S. PATENT DOCUMENTS

| | | |
|---|---|---|
| 7,349,644 B2 | 3/2008 | Morikawa |
| 7,747,964 B2 | 6/2010 | Morikawa |
| 8,179,559 B2 | 5/2012 | Sawada |
| 8,331,000 B2 | 12/2012 | Fujiwara |
| 8,469,353 B2 | 6/2013 | Unno |
| 8,520,228 B2 * | 8/2013 | Yamamoto ............ G06F 3/1204 358/404 |
| 8,646,769 B2 | 2/2014 | Unno |
| 8,730,513 B2 | 5/2014 | Sawada |
| 8,760,711 B2 | 6/2014 | Sawada |
| 9,224,078 B2 | 12/2015 | Sawada |
| 9,239,977 B2 | 1/2016 | Hibi |
| 9,607,252 B2 | 3/2017 | Sawada |
| 10,115,043 B2 | 10/2018 | Sawada |
| 2002/0085186 A1 | 7/2002 | Sawada |
| 2002/0171864 A1 | 11/2002 | Sesek |
| 2005/0100378 A1 | 5/2005 | Kimura et al. |
| 2006/0176531 A1 | 8/2006 | Sawada |
| 2007/0296748 A1 * | 12/2007 | Oki ................. G06F 3/1255 347/14 |
| 2009/0166949 A1 | 7/2009 | Unno |
| 2010/0178067 A1 * | 7/2010 | Azami ............. G03G 15/6508 399/16 |
| 2011/0026076 A1 * | 2/2011 | Sawano ............. G06F 3/1208 358/1.15 |
| 2011/0222115 A1 * | 9/2011 | Yamamoto ........... G06F 3/1219 358/1.15 |
| 2011/0235070 A1 * | 9/2011 | Otomaru ............. H04N 1/387 358/1.9 |
| 2011/0242584 A1 | 10/2011 | Igarashi |
| 2014/0211226 A1 | 7/2014 | Ishii |
| 2016/0094745 A1 | 3/2016 | Yamamoto |
| 2016/0100077 A1 | 4/2016 | Hibi |
| 2018/0107146 A1 | 4/2018 | Shinohara et al. |
| 2018/0115676 A1 | 4/2018 | Shibuya et al. |
| 2019/0012584 A1 | 1/2019 | Sawada |

FOREIGN PATENT DOCUMENTS

| | | |
|---|---|---|
| JP | H10-129072 A | 5/1998 |
| JP | H11-194667 A | 7/1999 |
| JP | 2000-295465 A | 10/2000 |
| JP | 2002-248831 A | 9/2002 |
| JP | 2003-312092 A | 11/2003 |
| JP | 2011-188294 A | 9/2011 |
| JP | 2015-009482 A | 1/2015 |
| JP | 2016-152025 A | 8/2016 |

* cited by examiner

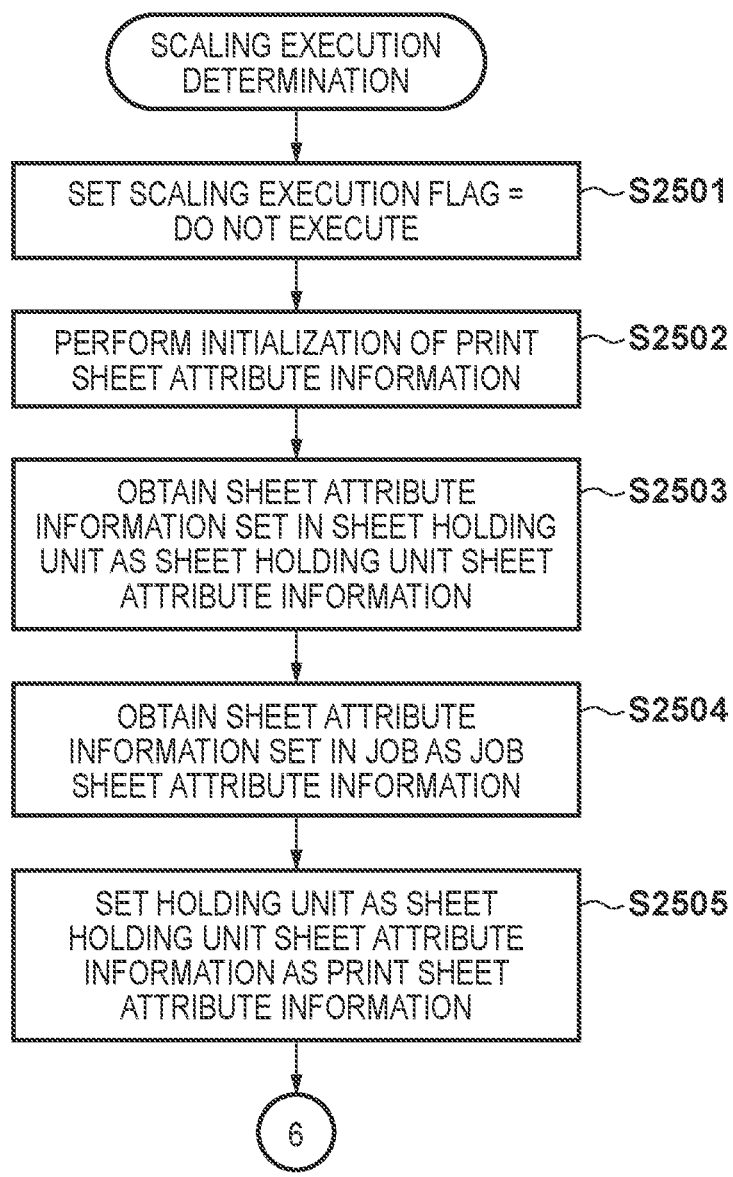

IMAGE FORMING APPARATUS USING SHEET ATTRIBUTE DETERMINATION TO EXECUTE PRINTING, TO DETERMINE WHETHER TO STOP OR CONTINUE PRINTING BASED ON SHEET ATTRIBUTE DETERMINATION AND SHEET STORAGE DESIGNATED AND CONTROL METHOD

This application is a divisional of application Ser. No. 16/029,949, filed Jul. 9, 2018.

BACKGROUND OF THE INVENTION

Field of the Invention

The present invention relates to an image forming apparatus that performs printing on a sheet fed from a feeding stage and a control method thereof.

Description of the Related Art

Conventionally, there is known a carbon copy function of generating printed products by setting a feeding stage to perform feeding for an original copy and a feeding stage to perform feeding for a duplicate copy and switching the feeding stages at the end of each copy (Japanese Patent Laid-Open No. 2011-188294).

In a carbon copy function in which the feeding stage is switched for each copy, a job is executed by designating a feeding stage for each copy or a feeding stage for an original copy and a feeding stage for a duplicate copy. In this case, although the feeding stage settings will change for different copies, other settings are in common, and the output sheet size is the same. That is, for each copy, printing is performed from the designated feeding stage based on image data that has the same output sheet size setting.

However, sheets of the same size may not be set in all of the plurality of feeding stages. Hence, a user may make a print instruction without realizing that sheets of different sizes have been set. In such a case, for example, a printed product with a truncated image may be obtained if the size of the sheets set in the feeding stage is smaller than the output sheet size designated by the job or, on the other hand, if the size of the sheets set in the feeding stage is larger, a printed product with a wide margin may be obtained, thereby resulting in a printed product undesired by the user.

SUMMARY OF THE INVENTION

An aspect of the present invention is to eliminate the above-mentioned problems with the conventional technology. The present invention provides an image forming apparatus that prevents the output of a print product on which an original image has not been appropriately printed when performing a copying operation of a plurality of copies based on the original image by using a plurality of feeding stages.

The present invention in one aspect provides an image forming apparatus comprising: an execution unit configured to execute printing of a plurality of copies based on an original image by causing a feeding stage set for each of the plurality of copies to perform feeding; and a control unit configured to control a feed operation so as to stop feeding from the feeding stage in a case where a sheet attribute designated in a job for executing the printing of the plurality of copies by the execution unit and a sheet attribute set in a feeding stage which serves as a feed target are different from each other.

According to the present invention, it is possible to prevent the output of a print product on which an original image has not been appropriately printed when performing a copying operation of a plurality of copies based on the original image by using a plurality of feeding stages.

Further features of the present invention will become apparent from the following description of exemplary embodiments with reference to the attached drawings.

BRIEF DESCRIPTION OF THE DRAWINGS

FIGS. 25A and 25B are flowcharts showing scaling execution determination processing.

DESCRIPTION OF THE EMBODIMENTS

Figure 1:
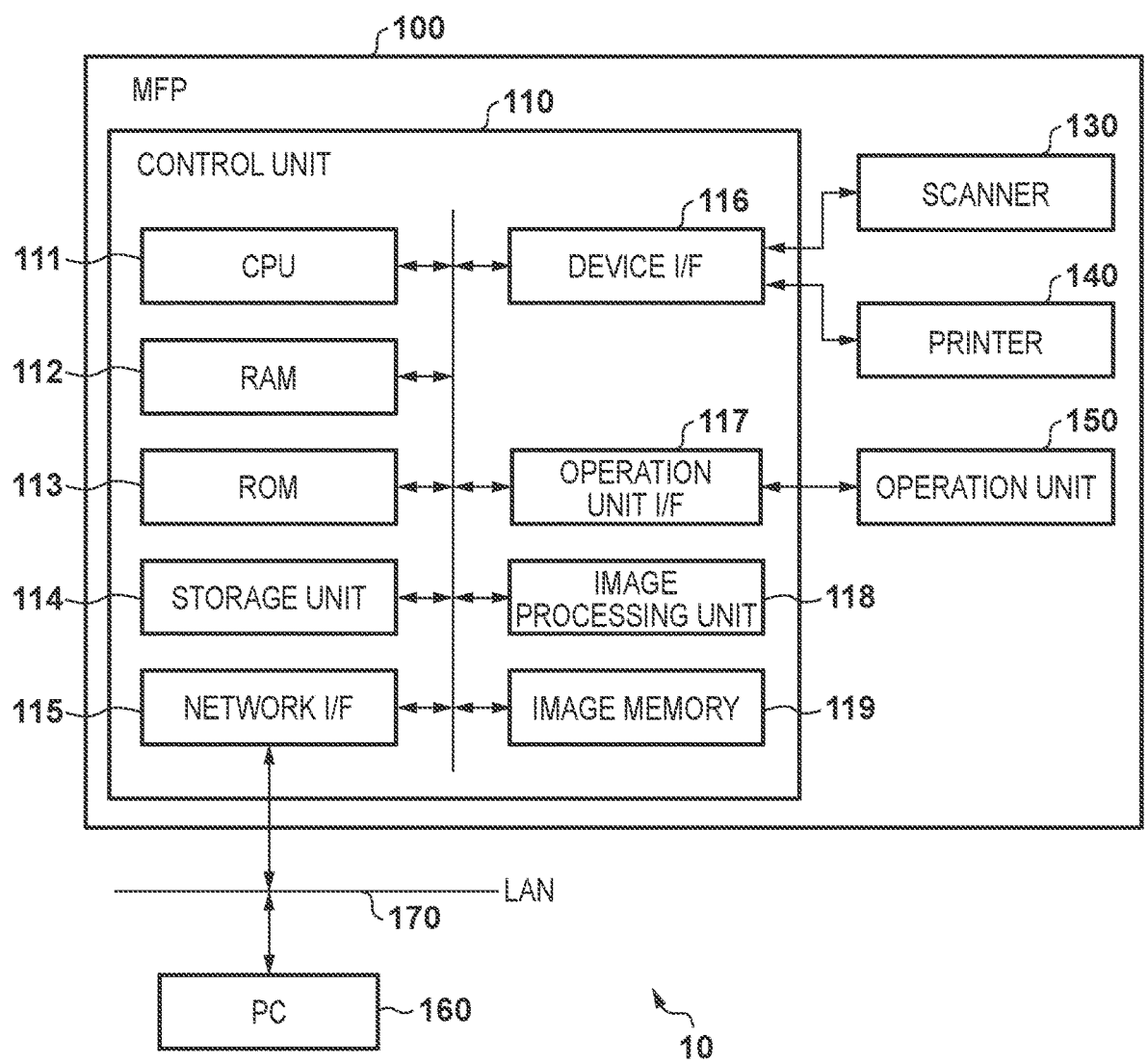
FIG. 1 is a block diagram showing the arrangement of an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will be omitted.

First Embodiment

FIG. 1 is a block diagram showing the arrangement of an MFP 100 which is used as an image forming apparatus according to this embodiment. A system 10 is an image processing system that includes the MFP 100 and a PC 160, and image processing such as printing and scanning is executed in the MFP 100 by an instruction from the PC 160. The PC 160 and the MFP 100 can also cooperatively perform image processing together.

A control unit 110 is connected to a scanner 130 which is an image input device and a printer 140 which is an image output device, and the control unit controls the input and output of image information between each device. The control unit 110 is also connected to a network 170 such as wired medium LAN or wireless medium LAN and communicates with an external apparatus via the network 170. For example, the control unit 110 receives, via the LAN, a print job from the PC 160 which is an external apparatus.

The CPU 111 comprehensively controls the operation of the MFP 100 and operates based on a program which is stored in, for example, a RAM 112. A ROM 113 is, for example, a boot ROM and stores a system boot program. A storage unit 114 stores system software, image data, programs for controlling the operations of the MFP 100, and the like. The CPU 111 loads, onto the RAM 112, a program stored in the storage unit 114 and controls, based on the program, each unit of the MFP 100 so as to implement an operation of the MFP 100, for example, an operation according to this embodiment.

A network I/F 115 inputs/outputs various kinds of information by connecting the control unit 110 to the network 170 such as a LAN and communicating with an external apparatus such as the PC 160. A device I/F 116 connects the control unit 110 to the scanner 130 and the printer 140 which are image input/output devices, and the device I/F performs synchronous/asynchronous conversion of image data. An operation unit I/F 117 is an interface that connects the control unit 110 to an operation unit 150, and the operation unit I/F outputs, to the operation unit 150, data which is to be displayed on the operation unit 150. The operation unit 150 includes a panel and hardware keys and can accept instructions and setting operations from a user. The data to be displayed on the operation unit 150 also includes user interface screens of this embodiment (to be described later). The operation unit OF 117 also transmits information input by the user from the operation unit 150 to the CPU 111.

The image processing unit 118 performs, on print target data which has been received via the network, an image processing operation, for example, correction, interpolation, conversion, and the like corresponding to the settings or the input/output device characteristics. The image processing unit 118 also performs image processing on image data which has been input to the device OF 116 or is to be output from the device OF 116. An image memory 119 is a memory to temporarily load the image data which is to be processed by the image processing unit 118.

Figure 2:
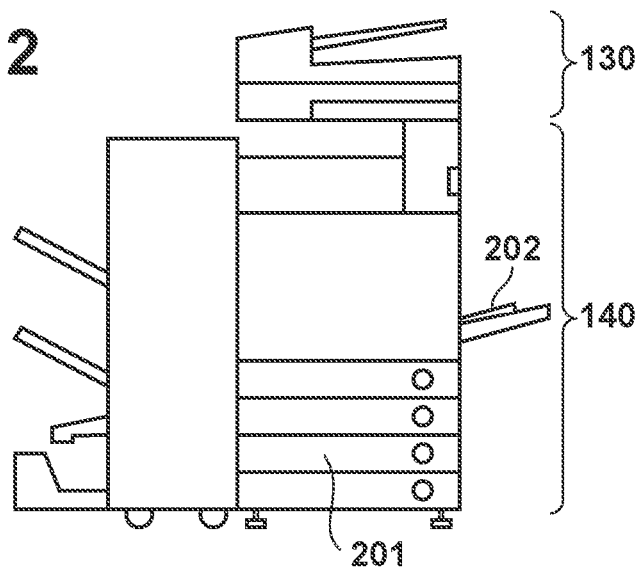
FIG. 2 is an external view of the image forming apparatus.

FIG. 2 is an external view of the MFP 100. The scanner 130 is arranged on the printer 140 in the MFP 100. The printer 140 includes two types of sheet holding units, a plurality of cassettes 201 that can hold several hundred sheets in each unit and a manual feed tray 202 which allows sheets to be replaced by print media desired by the user. Information of the sheet size and type set in each cassette 201 is set by the user via an operation screen (not shown) and stored in the ROM 113 in association with the cassette. Note that the information of the sheet size and type set in each cassette 201 and the manual feed tray 202 is obtained by, for example, sensors which are arranged in a plurality of locations in each cassette 201 and the manual feed tray 202 or by a sensor that can detect the reflectance from a medium.

Figure 3:
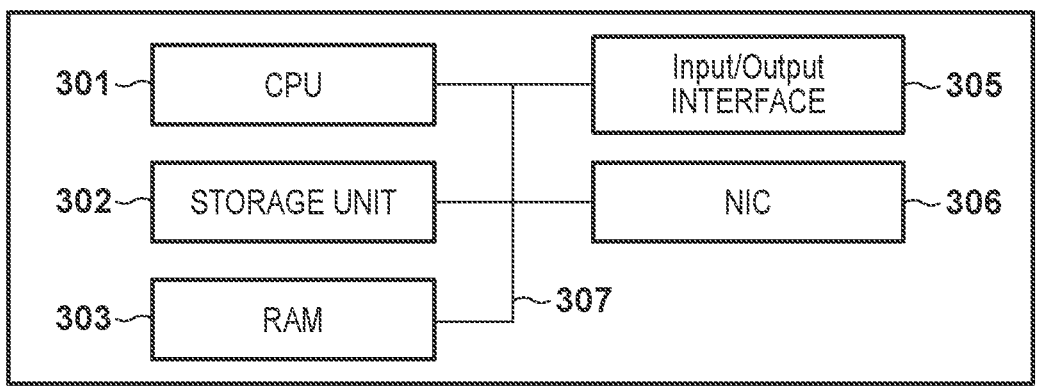
FIG. 3 is a block diagram showing the hardware arrangement of a PC.

FIG. 3 is a block diagram showing the hardware arrangement of the PC 160. A CPU 301 implements various kinds of functions by comprehensively controlling the overall PC 160 by executing various kinds of programs. A storage unit 302 stores various types of programs, setting data, and the like. For example, the CPU 301 loads, onto a RAM 303, a program which is stored in the storage unit 302 and executes the program. The RAM 303 is also used as a temporary work storage area of the CPU 301. An Input/Output interface 305 transmits data to each apparatus and a display (not shown) connected to the PC 160, and receives data from a pointing device (not shown). A NIC (Network Interface Card) 306 connects the PC 160 to the network 170 and performs input/output of various kinds of information with the network 170. The blocks described above are connected to each other via a bus 307 so as to be capable of exchanging data with each other.

Figure 4:
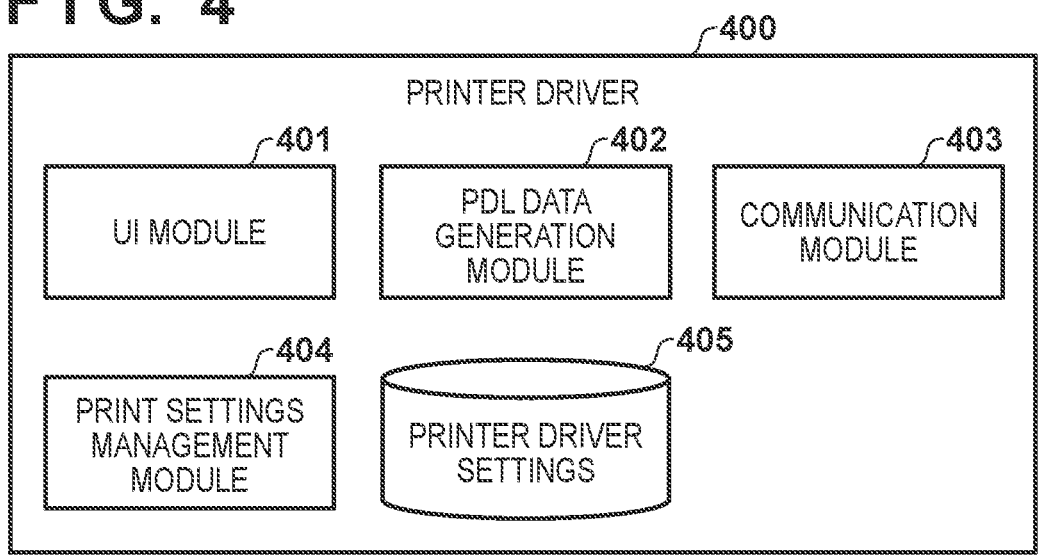
FIG. 4 is a block diagram showing the arrangement of a printer driver.

FIG. 4 is a block diagram showing the arrangement of a printer driver 400 as software operating on the PC 160. The printer driver 400 is stored in the storage unit 302. The printer driver 400 has a function of communicating with the MFP 100 in response to a request from an application and transmitting PDL (Page Description Language) data which is generated in the PC 160 to the MFP 100.

The printer driver 400 includes a UI (User Interface) module 401, a PDL data generation module 402, a communication module 403, a print settings management module 404, and printer driver settings 405. The UI module 401 provides a user interface related to the print settings of the printer driver 400. The PDL data generation module 402 generates PDL data based on the designated print settings. The communication module 403 performs network communication with the MFP 100 via the NIC 306. The print settings management module 404 presents, via the UI module 401, a print setting screen to the user and manages the setting information related to the designated print execution operation. The printer driver settings 405 are pieces of printer driver setting information which are to be stored in the storage unit 302 and are managed by the print settings management module 404.

Figure 5A:
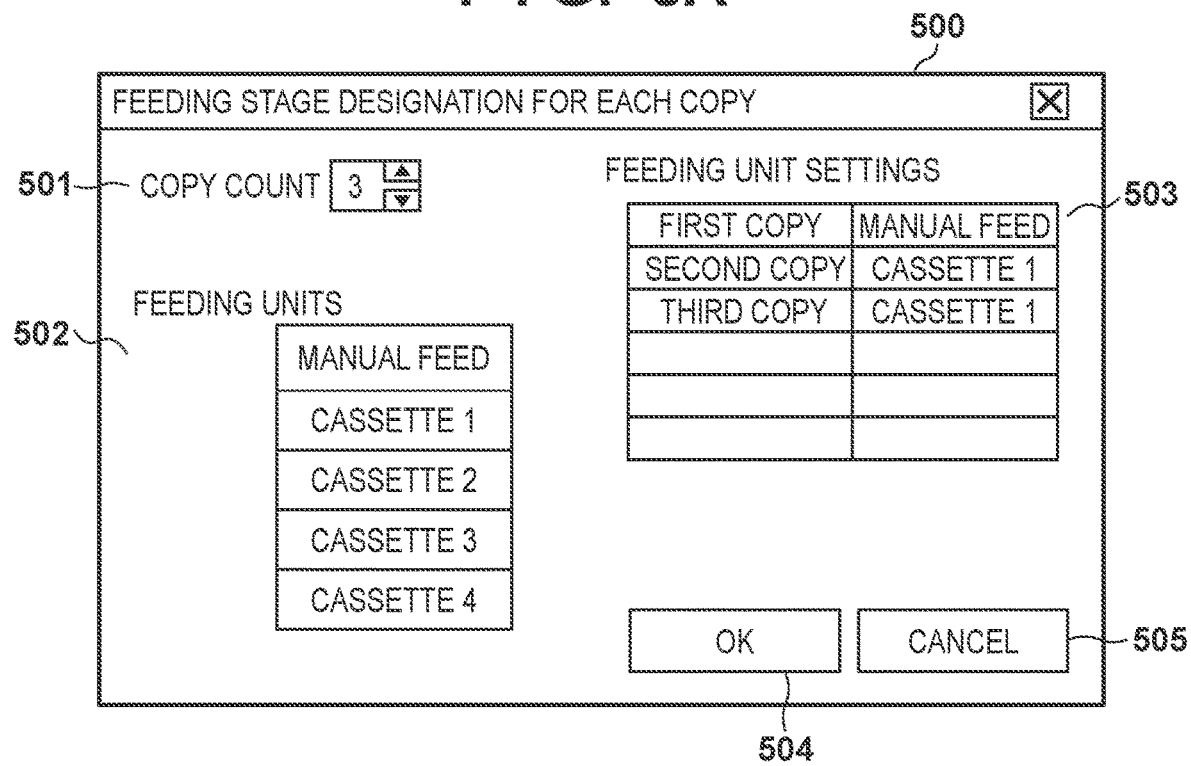
FIGS. 5A and 5B are views each showing an UI screen for switching a sheet supply source.
Figure 5B:
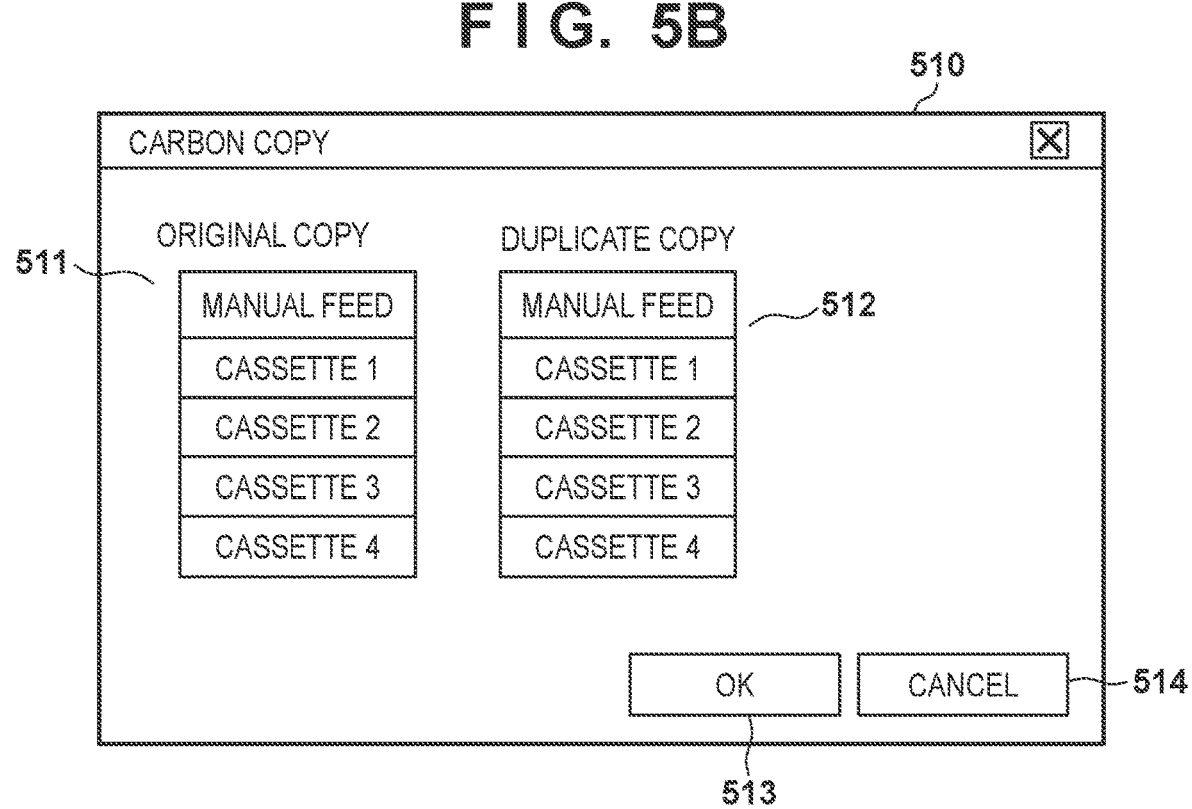

FIGS. 5A and 5B are views each showing an example of a UI screen of the printer driver 400 for switching the sheet supply source that is to perform feeding for each copy. In this embodiment, the MFP 100 can execute a so-called carbon copy operation by causing feeding stages, which have been arbitrarily designated as feed targets for the plurality of copies, respectively, to output printed products. When executing the carbon copy operation, the user can make feeding stage settings as shown in FIGS. 5A and 5B.

FIG. 5A shows a UI screen on which a sheet supply source (feeding stage) is selected for each copy. A setting screen 500 includes a sheet supply source setting copy count selection portion 501, a sheet supply source selection portion 502, a sheet supply source setting list 503, an OK button 504, and a cancel button 505. The sheet supply source setting copy count selection portion 501 accepts the selection of number of copies whose sheet supply sources are to be selected. FIG. 5A exemplifies a case where the settings of the third copy are made. The sheet supply source selection portion 502 is used to select the sheet supply source to be used to feed sheets when a copy count has been selected in the sheet supply source setting copy count selection portion 501. FIG. 5A shows that a cassette 1 has been selected for the printing of the third copy. The number of sheet supply sources displayed on the sheet supply source selection portion 502 corresponds to the cassettes 201 and the manual feed tray 202 arranged in the MFP 100.

The sheet supply source setting list 503 is an area displaying the setting contents for each copy that has been set by the sheet supply source setting copy count selection portion 501 and the sheet supply source selection portion 502. FIG. 5A shows that feeding from the manual feed tray has been selected for the printing of the first copy, feeding from the cassette 1 has been selected for the printing of the second copy, and feeding from the cassette 1 has been selected for the printing of the third copy. When the OK button 504 is pressed in a state in which the sheet supply source has been set for each copy by the sheet supply source setting copy count selection portion 501 and the sheet supply source selection portion 502, the setting information on the setting screen 500 is saved as the printer driver settings 405. If the cancel button 505 is pressed, the setting information is discarded.

Note that if the number of sheet supply sources set by the setting screen 500 is less than the number of print copies set by a copy setting portion (not shown), the sheet supply source that was selected last on the sheet supply source setting list 503 will be set as the designated sheet supply source of the remaining copies.

FIG. 5B shows an example of the UI screen when sheet supply sources are to be switched by discriminating printing use types such as original-copy printing and duplicate-copy printing. A setting screen 510 includes an original copy sheet supply source selection portion 511, a duplicate copy sheet supply source selection portion 512, an OK button 513, and a cancel button 514. The original copy sheet supply source selection portion 511 accepts the selection of a sheet supply source which is to be used when printing an original copy. The duplicate copy sheet supply source selection portion 512 accepts the selection of a sheet supply source which is to be used when printing a duplicate copy. Here, control is performed so a sheet supply source which has been selected in the original copy sheet supply source selection portion 511 cannot be selected in the duplicate copy sheet supply source selection portion 512. The duplicate copy sheet supply source selection portion 512 may be set so that a plurality of selections can be made. When the OK button 513 is pressed in a state in which the sheet supply sources have been set by the original copy sheet supply source selection portion 511 and the duplicate copy sheet supply source selection portion 512, the setting information on the setting screen 510 is saved as the printer driver settings 405. If the cancel button 514 is pressed, the setting information is discarded.

Figure 6:
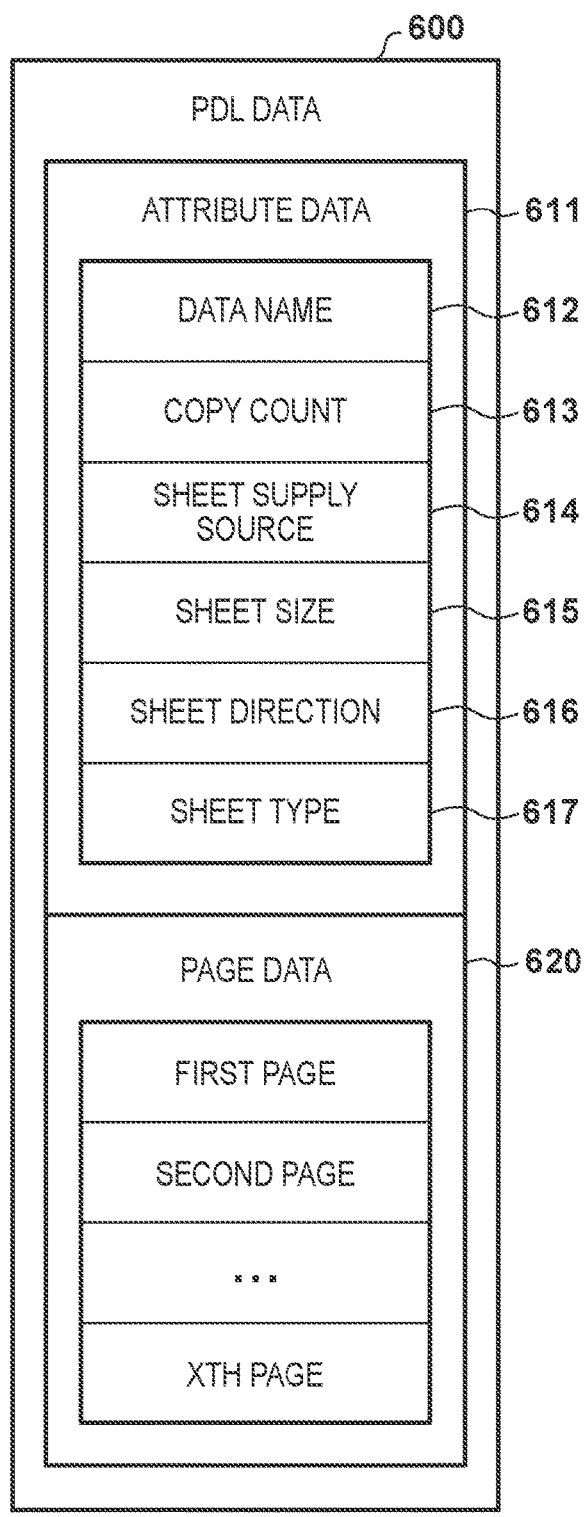
FIG. 6 is a view showing the concept of PDL data.

PDL job data will be described next. FIG. 6 is a view showing the concept of PDL data 600.

The PDL data 600 includes attribute data 611 and page data 620. The attribute data 611 includes pieces of information of a data name 612, a copy count 613, a sheet supply source 614, a sheet size 615, a sheet direction 616, and a sheet type 617. The data name 612 is a name for identifying the PDL data 600 and is information added based on the application data file name or the like which is to serve as the source of the PDL data 600. The copy count 613 is information indicating the number of print copies. The sheet supply source 614 is information indicating a sheet supply source which is to be used for printing. When the user designates a specific feeding stage as the sheet supply source, the information of the sheet supply source 614 will indicate one of the cassettes 201 and the manual feed tray 202. Note that designating a sheet supply source for a PDL job is arbitrary. In a case where the user does not designate a sheet supply source, for example, information indicating "automatic selection" will be stored as the information of the sheet supply source 614. In a case where the sheet supply source that is to perform feeding is to be switched for each copy, the sheet supply source corresponding to each copy will be stored as the information in the sheet supply source 614. When a plurality of sheet supply sources have been set in the sheet supply source 614 by such an arrangement, the CPU 111 can determine whether to perform sheet supply source switching processing for each copy.

The sheet size 615 is information indicating a sheet size designated by the user. Note that in this embodiment, designation of the sheet size is required for a PDL job. The sheet direction 616 is information indicating a sheet direction designated by the user. If the user does not designate a sheet direction, the information of the sheet direction 616 is omitted. The sheet type 617 is information indicating a sheet type designated by the user. Note that in this embodiment, designation of the sheet type is arbitrary for a PDL job. If the user does not designate a sheet type, the information of the sheet type 617 is omitted. The page data 620 includes image data of each page. In this manner, in this embodiment, the print settings and the contents of the printer driver settings 405 are reflected on the PDL job, and designation related to sheet supply switching for each copy is also included.

Figure 7:
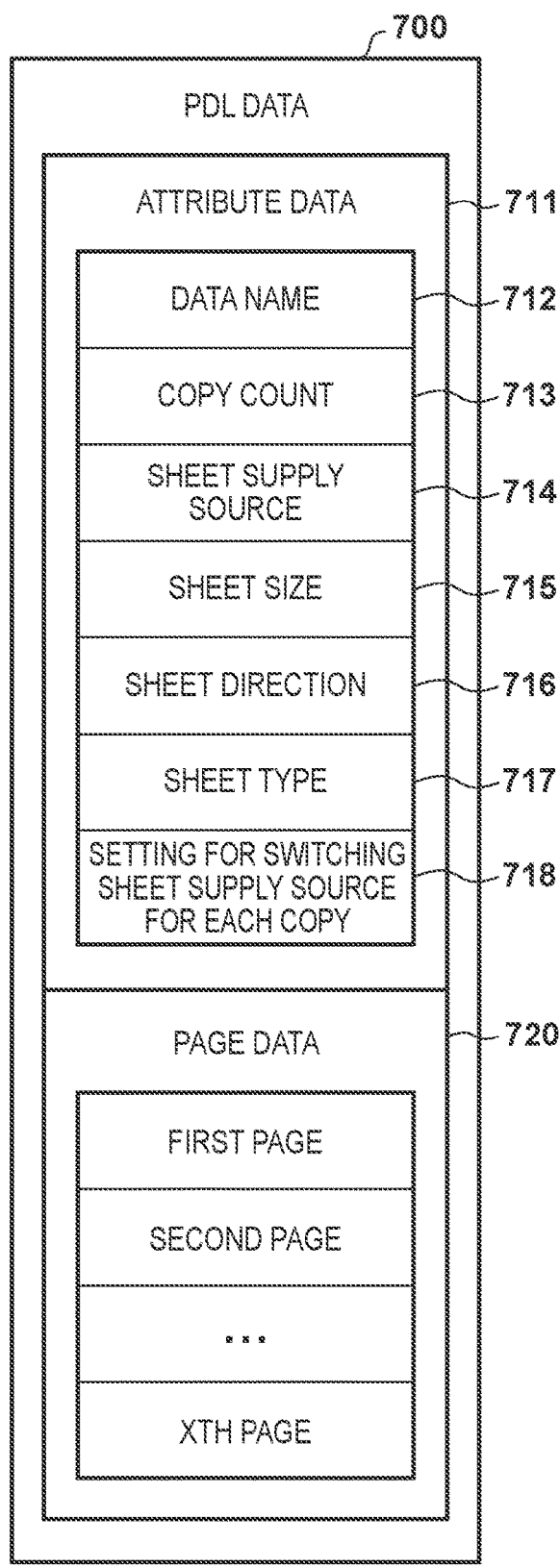
FIG. 7 is a view showing the concept of PDL data.

FIG. 7 is a view showing the concept of another set of PDL data 700 when the sheet supply source to perform feeding is to be switched for each copy. The PDL data 700 includes attribute data 711 and page data 720. The description of a data name 712, a copy count 713, a sheet supply source 714, a sheet size 715, sheet direction 716, and a sheet type 717 of the attribute data 711 and the page data 720 is the same as that of the data name 612 to sheet type 617 and the page data 620 in FIG. 6. Hence, the description will be omitted. A sheet supply source switching for each copy setting 718 of attribute data 711 is information for determining whether sheet supply source switching has been instructed for each copy from the printer driver 400. In a case where the PDL job shown in FIG. 7 is to be used, the CPU 111 determines whether to perform sheet supply switching processing for each copy based on the sheet supply source switching for each copy setting 718.

Figure 8:
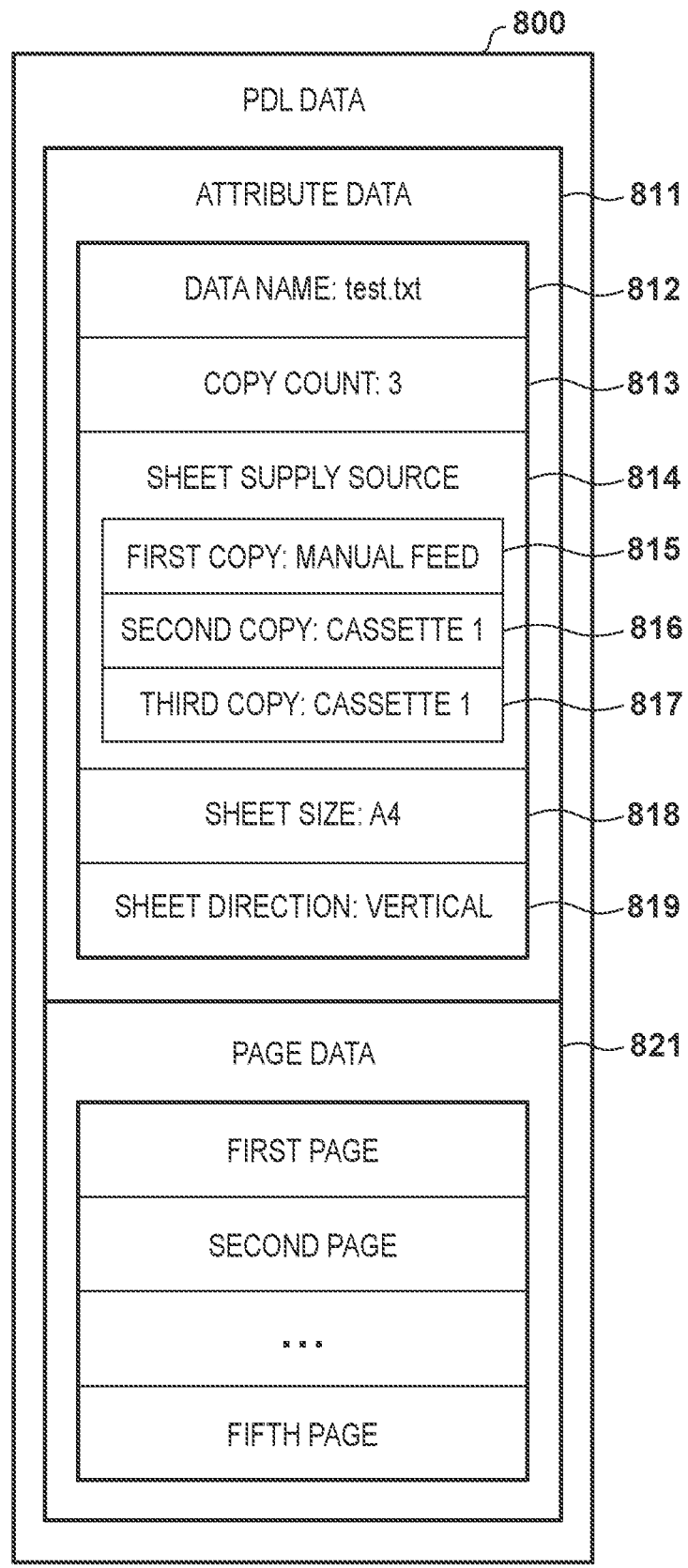
FIG. 8 is a view showing an example of the PDL data.

FIG. 8 is a view showing a more specific example of the PDL data 600. In this example, test.txt is set as a data name 812 and three is set as a copy count 813 in attribute data 811. As a sheet supply source 814, as shown in a sheet supply source 815, the manual feed tray has been set as the sheet supply source for the printing of the first copy. As shown by a sheet supply source 816, the cassette 1 has been set as the sheet supply source for the printing of the second copy. As shown by a sheet supply source 817, the cassette 1 has been set as the sheet supply source for the printing of the third copy. Since there are a plurality of sheet supply sources, as shown in FIG. 8, the CPU 111 determines to perform the sheet supply source switching processing for each copy. A4 is set as a sheet size 818, and vertical is set as a sheet direction 819. In this example, the sheet type has not been set. Data of five pages is included as page data 821.

Figure 9:
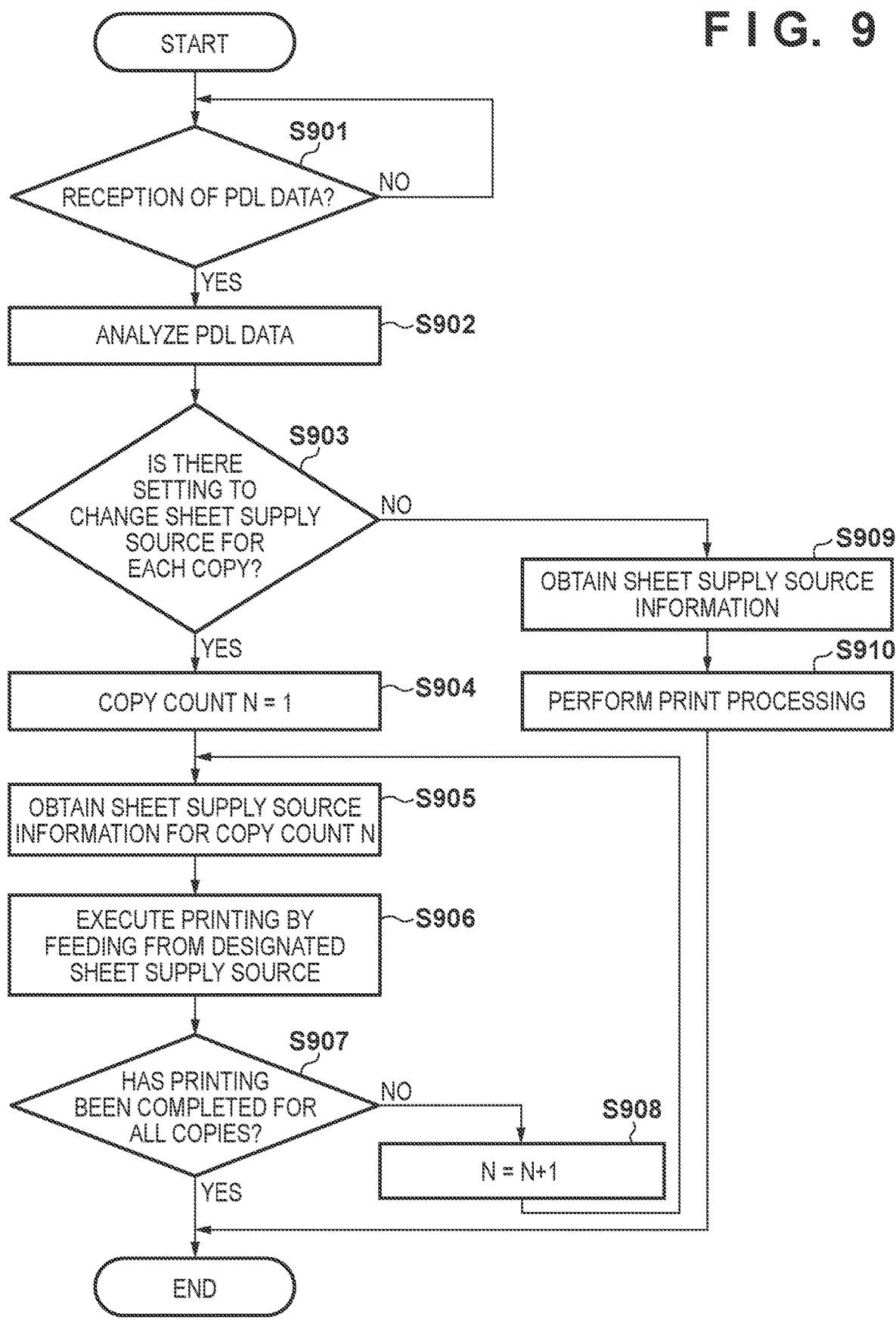
FIG. 9 is a flowchart showing PDL job execution processing.

The basic PDL job execution processing according to this embodiment will be described below. FIG. 9 is a flowchart showing the execution processing of a PDL job in which the sheet supply source is switched for each copy. Although both the PDL data 600 and the PDL data 700 are applicable to the operation according to this embodiment, the PDL data 600 will be exemplified hereinafter unless otherwise specified.

In step S901, the CPU 111 determines whether the PDL data 600 has been received from the PC 160. If it is determined that the PDL data 600 has been received, the process advances to step S902. If it is determined that the PDL data 600 has not been received, the process of step S901 is repeated. In step S902, the CPU 111 analyzes the received PDL data 600 and obtains, from the attribute data 611, at least the pieces of information of the sheet supply source 614, the sheet size 615, the sheet direction 616, and the sheet type 617.

In step S903, the CPU 111 determines whether there is a setting to change the sheet supply source for each copy. If it is determined that there is a change setting, the process advances to step S904. Otherwise, the process advances to step S909. The CPU 111 determines whether there is a setting to change the sheet supply source for each copy based on whether a plurality of sheet supply sources have been stored in the sheet supply source 614. The determination as to whether there is a setting to change the sheet supply source for each copy may also be performed based on ON/OFF of the sheet supply source change setting in the manner of the sheet supply source switching for each copy setting 718 of the PDL data 700.

The setting to change the sheet supply source for each copy may be set on the user interface (UI) of a computer on the side that is transmitting the print data by using the user interface of the printer driver or the like. The setting to change the sheet supply source for each copy includes, for example, an instruction to print out one copy of the same document from each of the plurality of feeding stages which have been designated on the UI of the printer driver or, for example, a carbon-copy printing instruction. The settings to change the sheet supply source for each copy is set in a print job or in the print data and transmitted from the PC 160 to the MFP 100.

In step S904, the CPU 111 initializes a counter N which represents the copy count by setting the counter N to 1. In step S905, the CPU 111 obtains the sheet supply source information of an Nth copy. In step S906, the CPU 111 performs feeding from the designated sheet supply source of the Nth copy and performs image printing processing. Here, execution of image rotation processing in accordance with the sheet direction and switching of fixing conditions in accordance with the sheet type may be performed in some cases.

In step S907, the CPU 111 determines whether all of the copies have been printed by comparing the counter N and the copy count 613 set in the PDL data 600. If it is determined that the all of the copies have been printed, the processing of FIG. 9 ends. On the other hand, if it is determined that all of the copies have not been printed, the process advances to step S908. In step S908, the CPU 111 increments the counter N by 1 and repeats the process of step S905.

On the other hand, if it is determined that there is no setting change in step S903, the CPU 111 obtains, in step S909, the sheet supply source 614. In step S910, the CPU 111 performs feeding from the sheet supply source set in the sheet supply source 614 and performs image printing processing. Subsequently, the processing of FIG. 9 ends.

Figure 10:
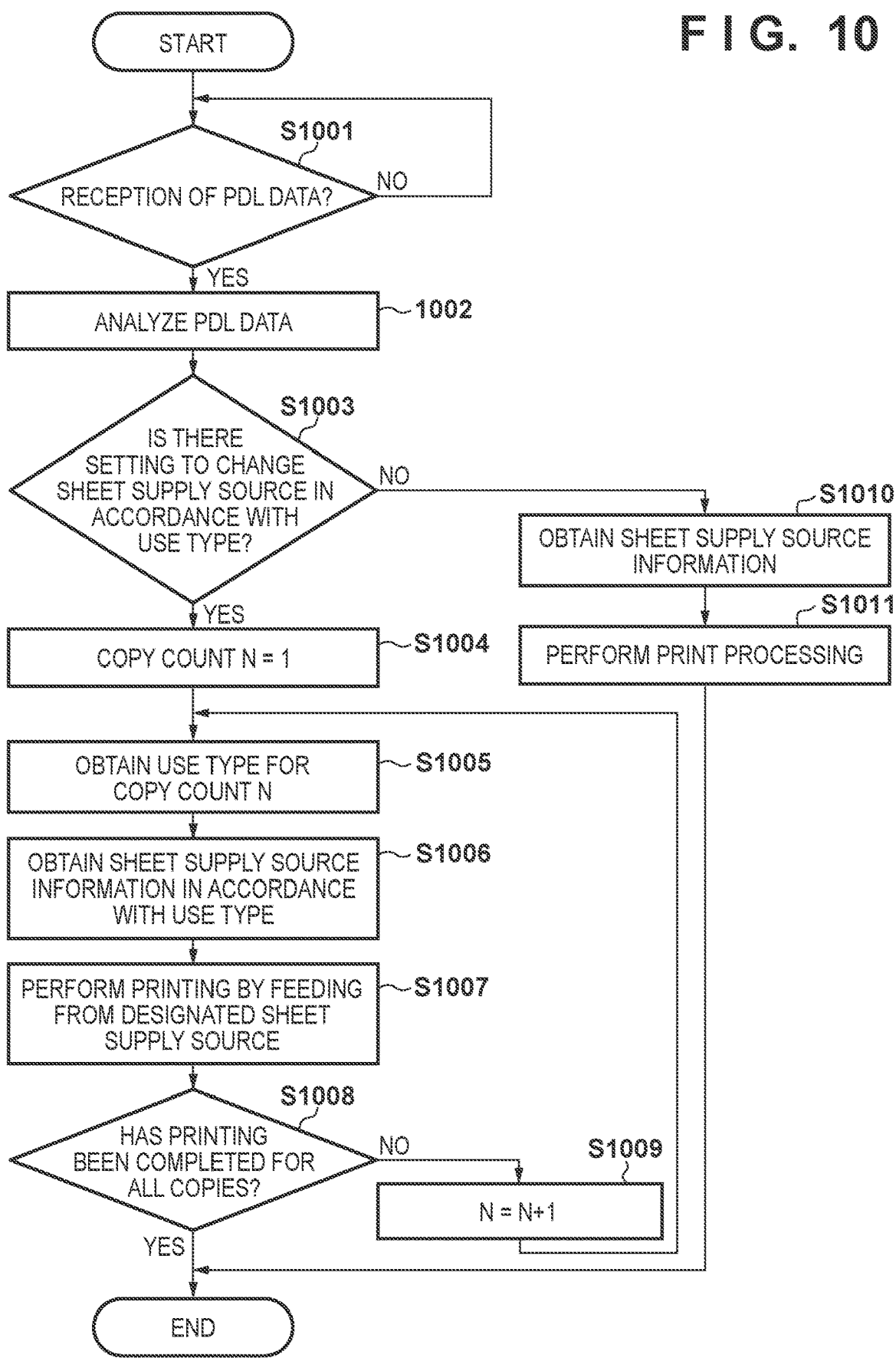
FIG. 10 is a flowchart showing PDL job execution processing.

FIG. 10 is a flowchart showing the execution processing of a PDL job in which the sheet supply source is switched in accordance with the use by discriminating uses as original-copy printing and duplicate-copy printing. In step S1001, the CPU 111 determines whether the PDL data 600 has been received from the PC 160. If it is determined that the PDL data 600 has been received, the process advances to step S1002. If it is determined that the PDL data 600 has not been received, the process of step S1001 is repeated. In step S1002, the CPU 111 analyzes the received PDL data 600 and obtains, from the attribute data 611, at least the pieces of information of the sheet supply source 614, the sheet size 615, the sheet direction 616, and the sheet type 617.

In step S1003, the CPU 111 determines whether there is a setting to change the sheet supply source in accordance with the use. If it is determined that there is a change setting, the process advances to step S1004. Otherwise, the process advances to step S1010. The determination of step S1003 may be performed, for example, in the following manner. For example, a use type, that is an attribute indicating "original-copy printing" and "duplicate-copy printing" may be added to the information of each sheet supply source of the sheet supply source 614. In this case, the CPU 111 refers to the attribute of the information of each sheet supply source and determines whether there is a setting to change the sheet supply source. The determination may also be performed based on the ON/OFF of the sheet supply source change setting in the manner of the sheet supply source switching for each copy setting 718 of the PDL data 700.

In step S1004, the CPU 111 initializes the counter N, which represents the copy count, to 1. In step S1005, the CPU 111 obtains the use type information of the Nth copy. In step S1006, the CPU 111 obtains the sheet supply source information in accordance with the use type. In step S1007, the CPU 111 performs feeding from the designated sheet supply source of the Nth copy and performs image printing processing. Here, the execution of image rotation processing in accordance with the sheet direction and the switching of fixing conditions in accordance with the sheet type may be performed in some cases.

In step S1008, the CPU 111 determines whether all of the copies have been printed by comparing the counter N and the copy count 613 set in the PDL data 600. If it is determined that the all of the copies have been printed, the processing of FIG. 10 ends. On the other hand, if it is determined that all of the copies have not been printed, the process advances to step S1009.

In step S1009, the CPU 111 increments the counter N by 1 and repeats the process of step S1005. If it is determined that there is no change setting in step S1003, the CPU 111 obtains, in step S1010, the sheet supply source 614. In step S1011, the CPU 111 performs feeding from the sheet supply source set in the sheet supply source 614 and performs image printing processing. Subsequently, the processing of FIG. 10 ends.

Figure 11:
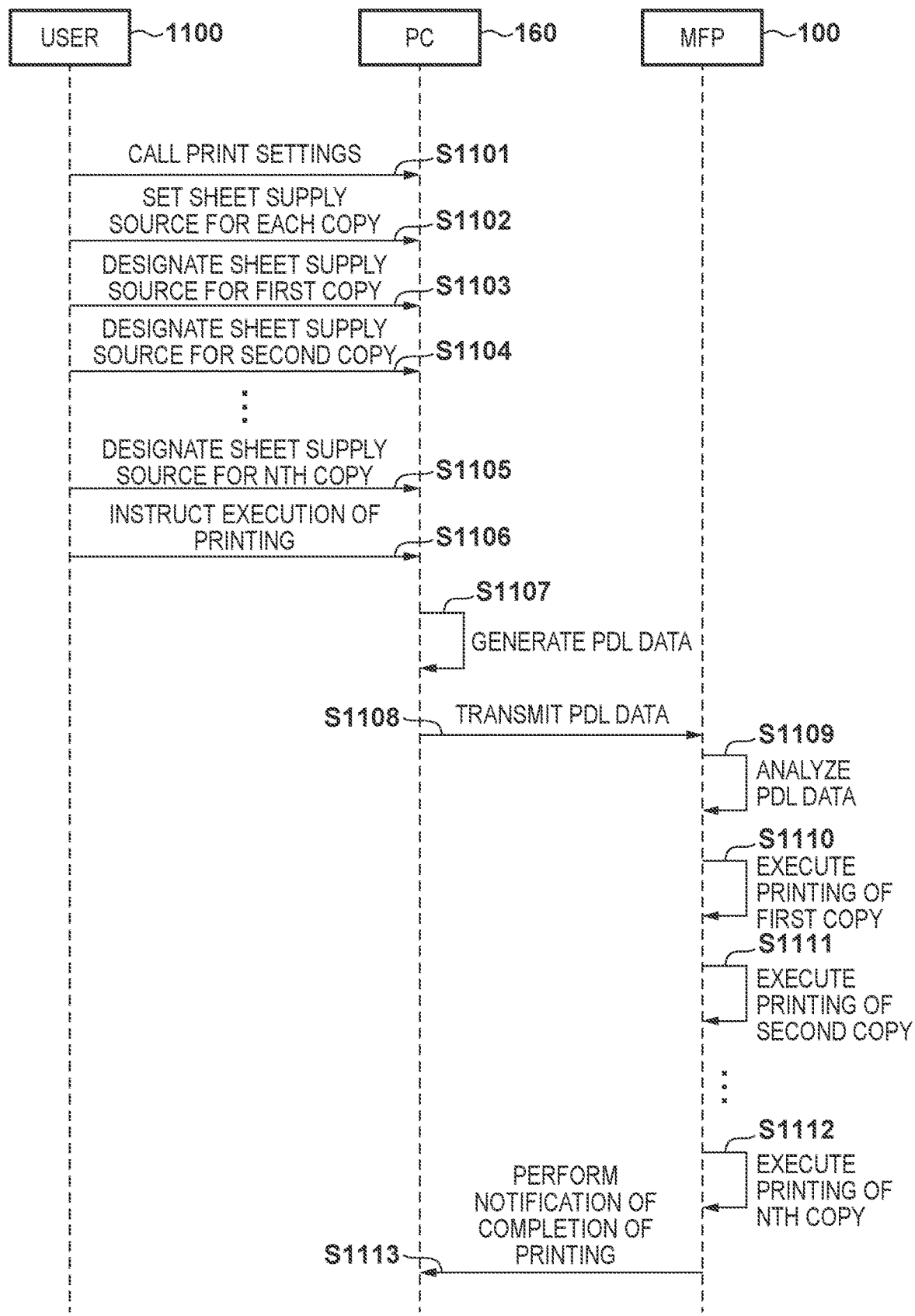
FIG. 11 is a sequence chart showing the procedure of print execution in an overall system.

FIG. 11 is a sequence chart showing the overall procedure from the activation of the printer driver 400 on the PC 160 by the user until the completion of printing in the MFP 100. When the user activates the printer driver 400 on the PC 160, a print setting operation is started (S1101). Upon accepting the selection of the sheet supply source setting for each copy by the printer driver 400, a sheet supply source is set for each copy (first copy to Nth copy) (S1102, S1103, S1104, and S1105).

A print execution instruction to the MFP 100 from the user is accepted by the printer driver 400 (S1106). In the PC 160, the printer driver 400 generates the PDL data 600 based on the designated print settings (51107). The printer driver 400 transmits the PDL data 600 to the MFP 100 (S1108).

Upon receiving the PDL data 600 from the PC 160, the MFP 100 analyzes the received PDL data 600 (S1109). The MFP 100 executes the printing of the first copy based on the analyzed PDL data 600. At this time, each sheet is supplied from the sheet supply source of the first copy which is set in the PDL data 600 (S1110). The MFP 100 repeatedly executes printing for the copies (the first copy to the Nth copy) set in the PDL data 600 (S1111 and S1112). When printing has been completed for all of the copies, the MFP 100 notifies the PC 160 of the completion of the printing (S1113).

Figure 12A:
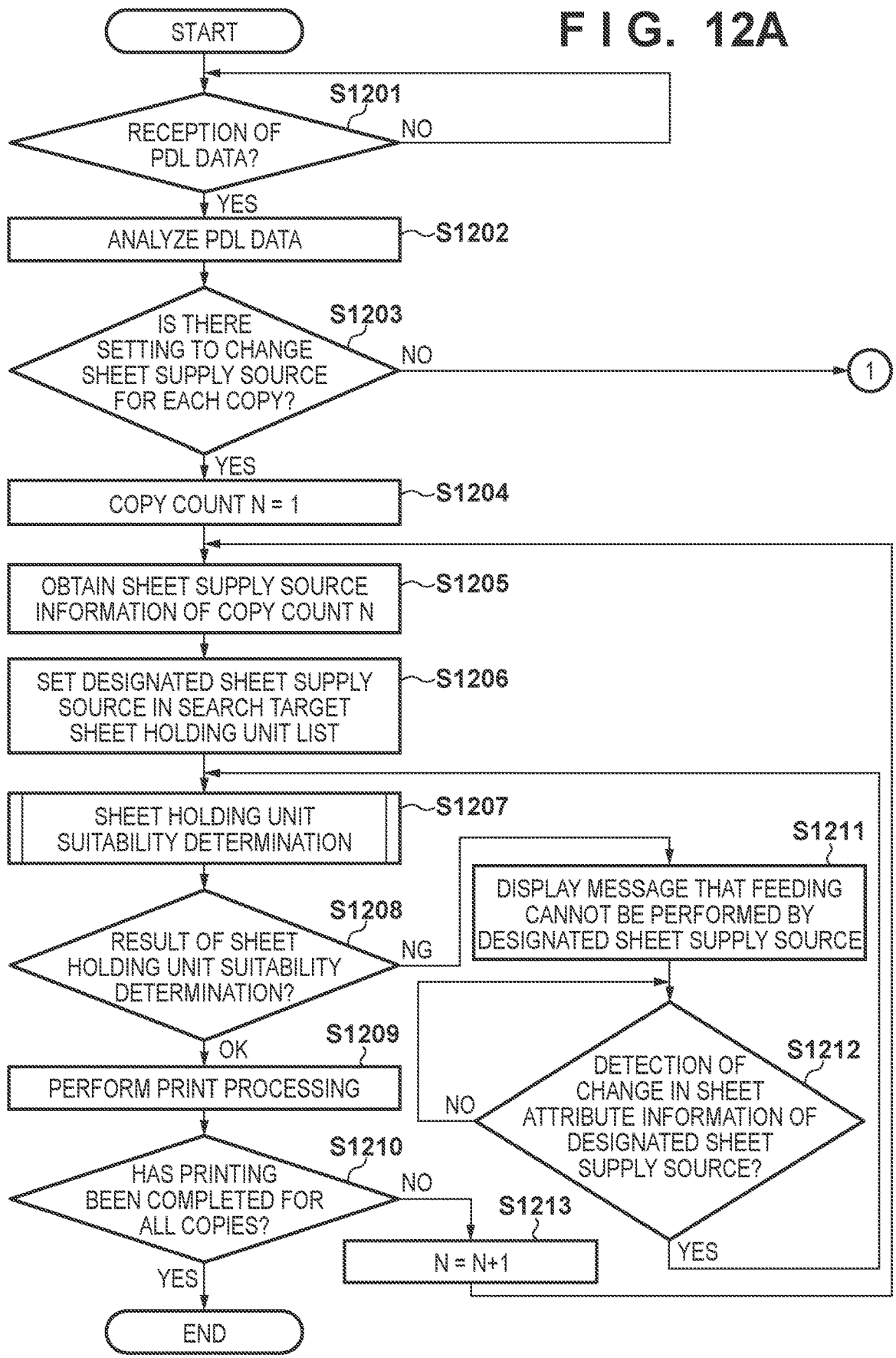
FIGS. 12A and 12B are flowcharts showing feed operation control processing.
Figure 12B:
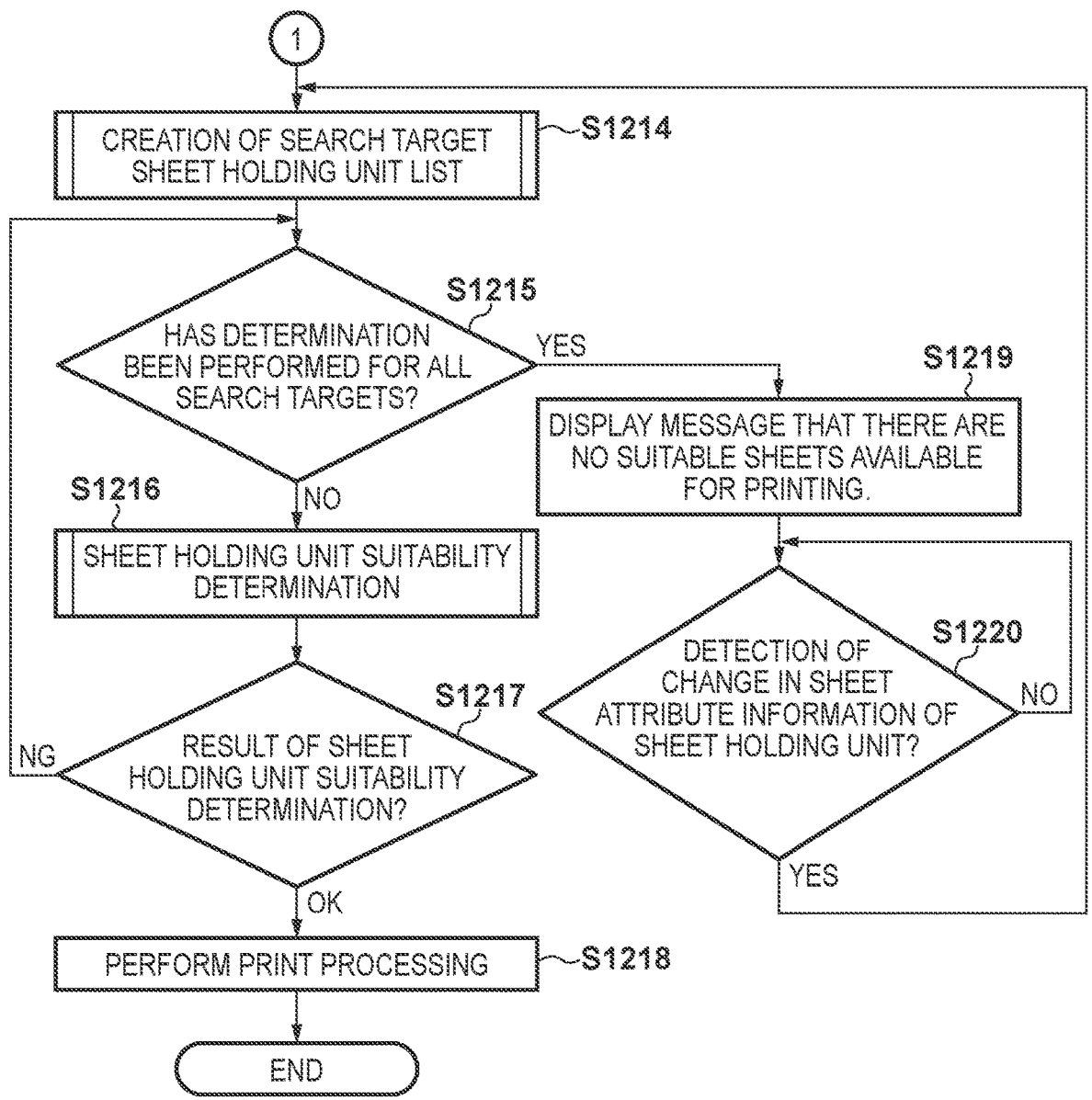

Sheet supply source switching processing performed in the execution processing of a PDL job according to this embodiment will be described hereinafter. FIGS. 12A and 12B are flowcharts showing processing to control a feed operation by comparing the sheet set in the PDL job and the sheet of the sheet supply source at the execution of the PDL job in which the sheet supply source is switched for each copy according to this embodiment. The processes of steps S1201 to S1205 are the same as those of steps S901 to S905, and a description thereof will be omitted.

In step S1206, the CPU 111 sets the obtained sheet supply source on a search target sheet holding unit list. The search target sheet holding unit list will be described later. In step S1207, the CPU 111 determines, for the search target sheet holding unit (feeding stage), whether the sheet size, the sheet direction, and the sheet type which allow the execution of printing of the received PDL data 600 have been set (sheet holding unit suitability determination). In step S1208, the CPU 111 switches the process to the next process in accordance with the determination result (to be described later) in step S1207. That is, if the determination result indicates "NG", the CPU determines that printing of the received PDL data 600 cannot be executed in the sheet holding unit and advances the process to step S1211. On the other hand, if the determination result indicates "OK", the CPU determines that the printing of the received PDL data 600 can be executed in the sheet holding unit, and image printing processing corresponding to the sheet attribute information is performed in step S1209.

In step S1210, the CPU 111 determines whether all of the copies have been printed by comparing the counter N and the copy count 613 set in the PDL data 600. If it is determined that the all of the copies have been printed, the processing of FIGS. 12A and 12B ends. On the other hand, if it is determined that all of the copies have not been printed, the process advances to step S1213. In step S1213, the CPU 111 increments the counter N by 1 and repeats the process of step S1205.

On the other hand, if the determination result indicates "NG" in step S1208, the CPU 111 displays, in step S1211, a message indicating, on the operation unit 150, that there are no suitable sheets available for printing. Next, the process advances to step S1212, and the CPU 111 stands by in this state until it detects a sheet attribute information change in one of the sheet holding units. When a change in the sheet attribute information has been detected, the process of step S1207 is repeated. Here, a change in the sheet attribute information in a sheet holding unit indicates, for example, replacement of sheets in the feeding stage by the user.

If it is determined that there is no setting change in step S1203, the CPU 111 creates, in step S1214, a list of search target sheet holding units, excluding a sheet holding unit which cannot be a sheet supply source, from all of the sheet holding units (the cassettes 201 and the manual feed tray 202) of the MFP 100. However, if a search target sheet holding unit list has been already created and held, this list can be read out and used for the following processing. Next, in step S1215, the CPU 111 determines, for each sheet holding unit on the search target sheet holding unit list which was created in step S1214, whether the sheet holding unit suitability determination processing of the next step S1216 has been performed. If there is a sheet holding unit which has not undergone the determination, the process advances to step S1216. In step S1216, the CPU 111 determines, for this search target sheet holding unit, whether the sheet size, the sheet direction, and the sheet type which allow the execution of printing of the received PDL data 600 have been set.

In step S1217, the CPU 111 switches to the next processing in accordance with the determination result. That is, if the determination result in step S1216 indicates "NG", the CPU determines that this sheet holding unit cannot execute printing of the received PDL data 600, returns the process to step S1215, and performs the determination for the next sheet holding unit. On the other hand, if the determination result of step S1216 indicates "OK", it is determined that this sheet holding unit can execute printing of the received PDL DATA 600, and the CPU 111 performs, in the next step S1218, the image printing processing corresponding to the sheet attribute information.

On the other hand, as a result of performing the sheet holding unit suitability determination processing of step S1216 for all of the search target sheet holding units in step S1215, if it is determined that there is no sheet holding unit that can execute printing of the received PDL data 600, the process advances to step S1219. In step S1219, the CPU 111 displays a message on the operation unit 150 indicating that there are no suitable sheets available for printing. Next, the process advances to step S1220, and the CPU 111 stands by in this state until it detects a sheet attribute information change in one of the sheet holding units. When a change in the sheet attribute information has been detected, the process returns to step S1214, and the search for the sheet holding unit is started again.

Figure 13:
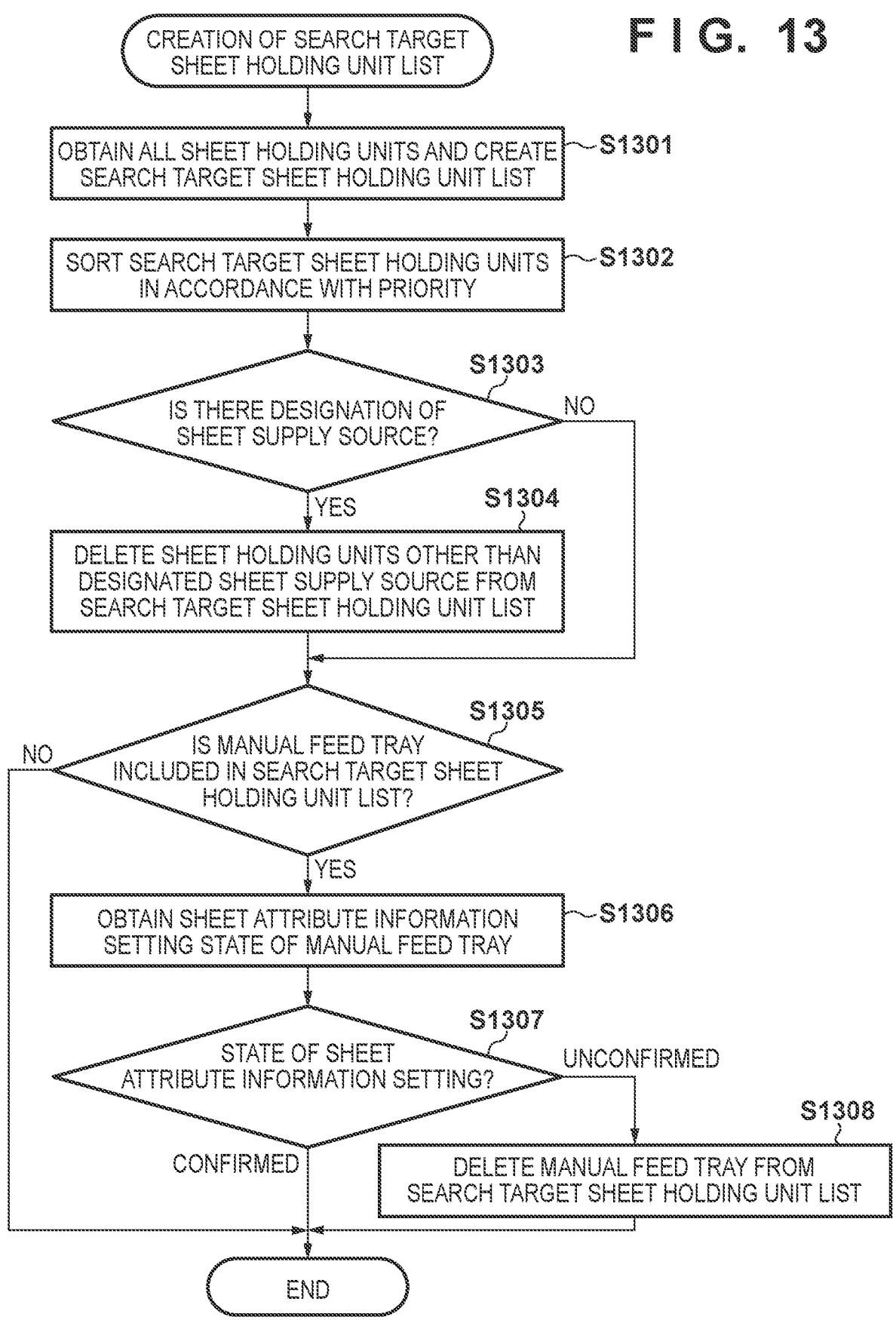
FIG. 13 is a flowchart showing creation processing of a search target sheet holding unit list.

Search target sheet holding unit list creation processing performed in step S1214 will be described next with reference to FIG. 13.

In step S1301, the CPU 111 obtains all the sheet holding units of the MFP 100 and creates a search target sheet holding unit list. Next, in step S1302, the CPU 111 sorts the obtained sheet holding units in accordance with a predetermined priority. For example, it is set so that, between the cassettes 201 and the manual feed tray 202, the priority order is higher for the cassettes 201, and for each cassette 201, the priority order is higher for a cassette that is closer to the print engine, that is, a cassette whose sheet conveyance path is shorter.

In step S1303, the CPU 111 determines whether there is a sheet supply source designation based on the analysis result of the PDL data 600 in step S1202. If it is determined that there is a sheet supply source designation, the process advances to step S1304, and the CPU 111 deletes the sheet holding units other than the designated sheet supply source from the search target sheet holding unit list which is sorted in step S1302. After step S1304, the process advances to step S1305. On the other hand, if is determined that there is no sheet supply source designation, the process advances to step S1305 without deleting the sheet holding units.

In step S1305, the CPU 111 determines whether the manual feed tray 202 is included in the search target sheet holding unit list. If it is determined that the manual feed tray 202 is not included, the creation of the search target sheet holding unit list is completed, and the processing of FIG. 13 ends. If it is determined that the manual feed tray 202 is included, the process advances to step S1306. In step S1306, the CPU 111 obtains, from the ROM 113, the sheet attribute information setting state of the manual feed tray 202.

In step S1307, the CPU 111 switches the processing to be executed next in accordance with the sheet attribute information setting state of the manual feed tray 202 obtained in step S1306. If the sheet attribute information setting state indicates a "confirmed state", the manual feed tray 202 is kept as a search target sheet holding unit, and the processing of FIG. 13 subsequently ends. On the other hand, if the state indicates an "unconfirmed state", the process advances to step S1308, and the CPU 111 deletes the manual feed tray 202 from the search target sheet holding unit list and subsequently ends the processing of FIG. 13.

Figure 14:
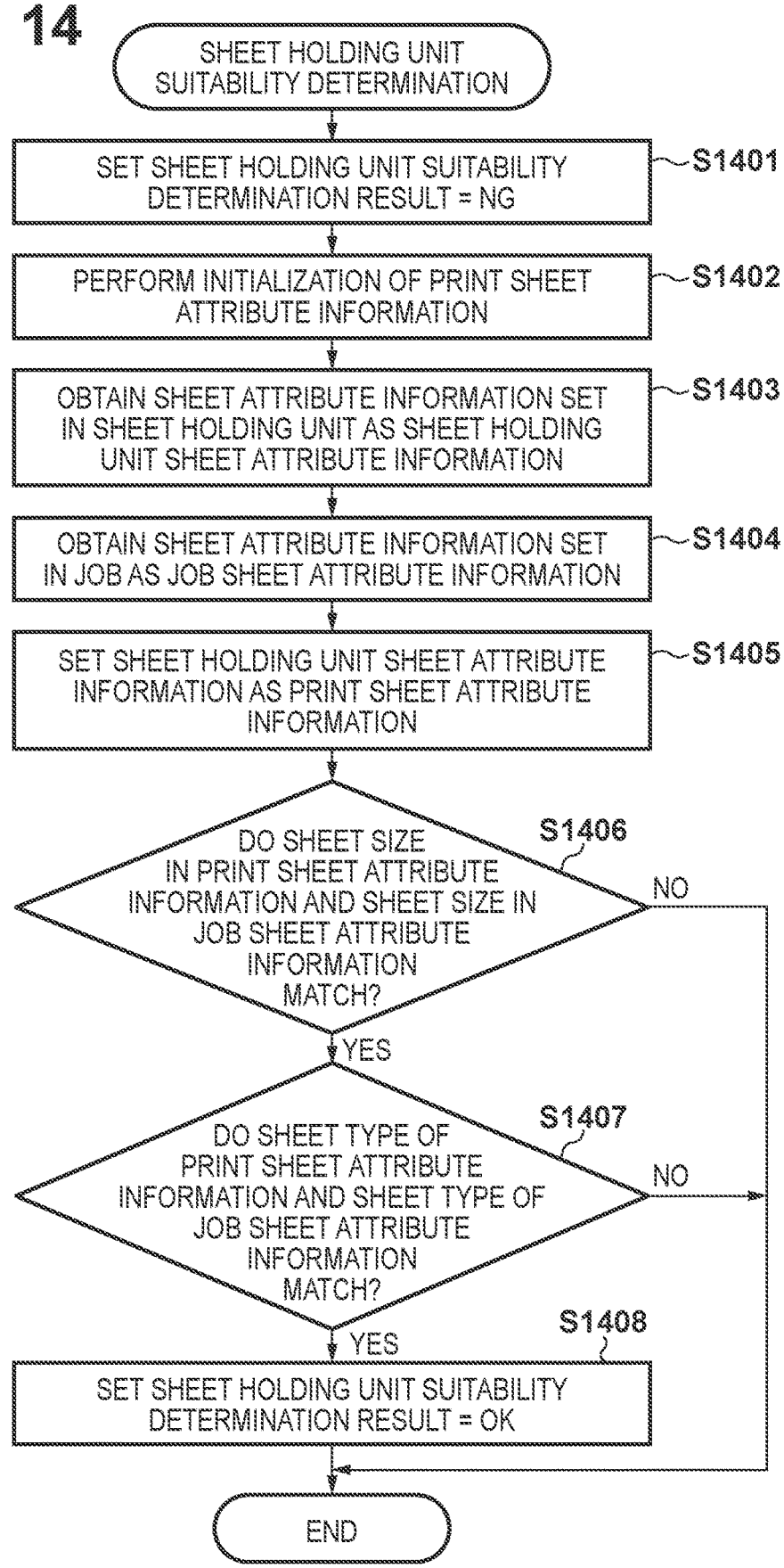
FIG. 14 is a flowchart showing sheet holding unit suitability determination processing.

The sheet holding unit suitability determination processing performed in steps S1207 and S1216 will be described next with reference to FIG. 14. In step S1401, the CPU 111 initializes the value of a variable representing the sheet holding unit suitability determination result by setting "NG". Next, in step S1402, the CPU 111 initializes the values of the variables of print sheet attribute information formed from the sheet size, the sheet direction, and the sheet type which are to be used in the sheet holding unit suitability determination.

Next, in step S1403, the CPU 111 obtains, as the sheet holding unit sheet attribute information, the sheet attribute information (to be described later) which is stored in the ROM 113 for the sheet holding unit which has been designated as the search target. In step S1404, the CPU 111 obtains the sheet attribute information set in the print job as the job sheet attribute information. For example, in the case of a PDL job, the CPU 111 obtains, as the job sheet attribute information, the sheet size 615, the sheet direction 616, and the sheet type 617 set in the PDL data 600. Here, if the sheet direction 616 has not been set, assume that the sheet size 615 will be used as a supplement.

Next, in step S1405, the CPU 111 sets, as the print sheet attribute information initialized in step S1402, the sheet holding unit sheet attribute information obtained in step S1403. In step S1406, the CPU 111 compares the sheet size set in the sheet holding unit sheet attribute information and the sheet size set in the job sheet attribute information. If it is determined that the sheet sizes match, the process advances to step S1407, and the CPU 111 compares, in the same manner as the sheet sizes, the sheet type set in the sheet holding unit sheet attribute information and the sheet type set in the job sheet attribute information. If the sheet type is not set in the job sheet attribute information, the process of step S1407 may be omitted. If there is no sheet type designation in the print job in advance, the determination may be performed by whether the sheet type set as a feed permitted sheet has been set in the sheet holding unit sheet attribute information. If it is determined that the comparison result does not indicate a match in either step S1406 or S1407, it is determined that the print job cannot be executed by the sheet of the sheet holding unit of interest, and the processing of FIG. 14 ends. On the other hand, if the comparison result indicates a match, the process advances to step S1408, and the CPU 111 sets "OK" as the value of the variable representing the sheet holding unit suitability determination result, and the processing of FIG. 14 ends.

Figure 15:
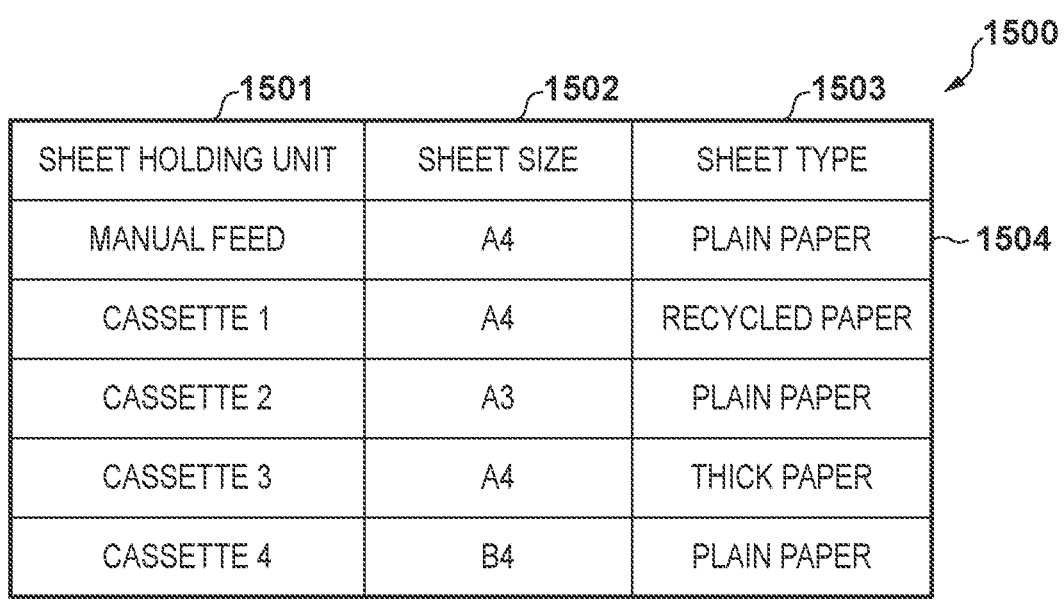
FIG. 15 is a table showing sheet attribute information

FIG. 15 is a table showing an example of the sheet attribute information stored in each sheet holding unit. For each set of sheet holding unit 1501, a sheet size 1502 and a sheet type 1503 are associated and held. For example, in a sheet attribute information 1504, if a manual feed tray has been set, the sheet size is A4 and plain paper is held as the sheet type.

Figure 16A:
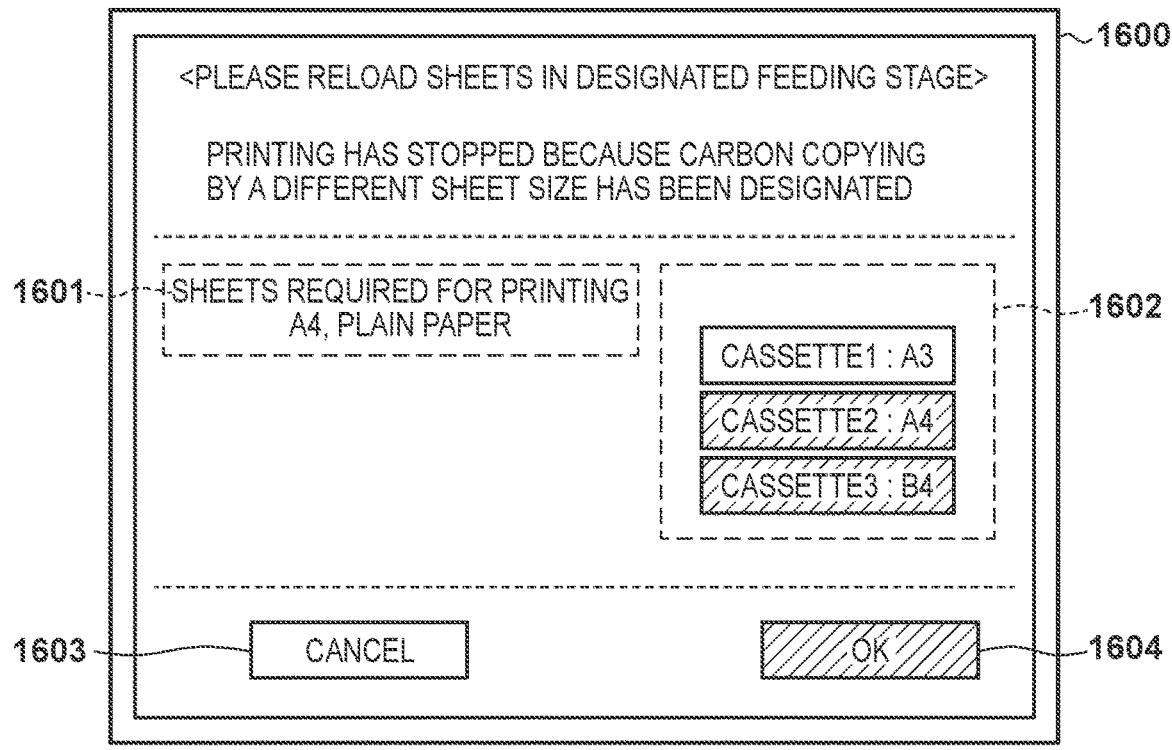
FIGS. 16A and 16B are views each showing a notification screen.

FIG. 16A is a view showing an example of a notification screen which is to be displayed on the operation unit 150 when feeding cannot be performed by the designated sheet supply source of step S1211 in FIGS. 12A and 12B. Information of sheets necessary for printing the current copy is displayed in an area 1601 of a screen 1600. Information of each sheet supply source is displayed in an area 1602. As shown in FIG. 16A, although the sheet size required for the printer is A4, A3 has been designated in the cassette 1 that is the designated sheet supply source. The screen 1600 is displayed, in this manner, when a feed operation cannot be performed by the designated sheet supply source. Furthermore, the user is notified by a message that "printing has stopped because carbon copying by a different sheet size has been designated".

Each hatched portion indicates a button whose display has been controlled so it cannot be selected. This example shows a case where the cassette 1 is designated as the sheet supply source for the current copy, and the selection of a sheet supply source other than the designated sheet supply source cannot be accepted. A cancel key 1603 is pressed when the printing is to be canceled, and when the key is pressed, the job is canceled and the printing is canceled. An OK key 1604 is display controlled so that the key can be pressed when the sheets have been replaced by the user and printing can be executed. When the OK key 1604 is pressed, the print processing is restarted.

In the same manner, a screen 1610 is another example of a screen which is to be displayed when feeding cannot be performed by the designated sheet supply source. The screen 1610 is different from the screen 1600 in that a "continue feed intact" key 1614 is displayed. The "continue feed intact" key 1614 is pressed when printing is to be continued as is by the designated sheet supply source even if the sheet size does not match. When the "continue feed intact" key 1614 is pressed, printing is continued by the designated sheet supply source. A "print only original copy" key 1616 and a "print only duplicate copy" key 1617 will be described in the second embodiment.

As described above, according to this embodiment, the sheet size/sheet type set to the job for each copy is compared with the sheet size/sheet type of the sheet supply source. As a result, even in a case where a job is executed in a state in which sheets of a size unintended by the user are set in the sheet holding unit when the sheet supply source is to be switched for each copy, it is possible to prevent the output of an unsuitable printed product by stopping the feed operation before the feed operation.

Second Embodiment

Points different from those in the first embodiment will be described for the second embodiment hereinafter. In place of switching the sheet supply source for each copy, the second embodiment will describe a method of performing feed determination when sheet supply sources are to be switched in accordance with the use type such as original-copy printing and duplicate-copy printing.

In this embodiment, information of sheet supply sources corresponding to the respective use types is included in PDL data 600. Among a copy count 613, information as to which copy is to be printed as the original copy and which copy is to be printed as the duplicate copy may be added to the PDL data 600. In a case where such information is unavailable, a determination is made to set the first copy as the original copy and set each subsequent copy as a duplicate copy by default.

Figure 17A:
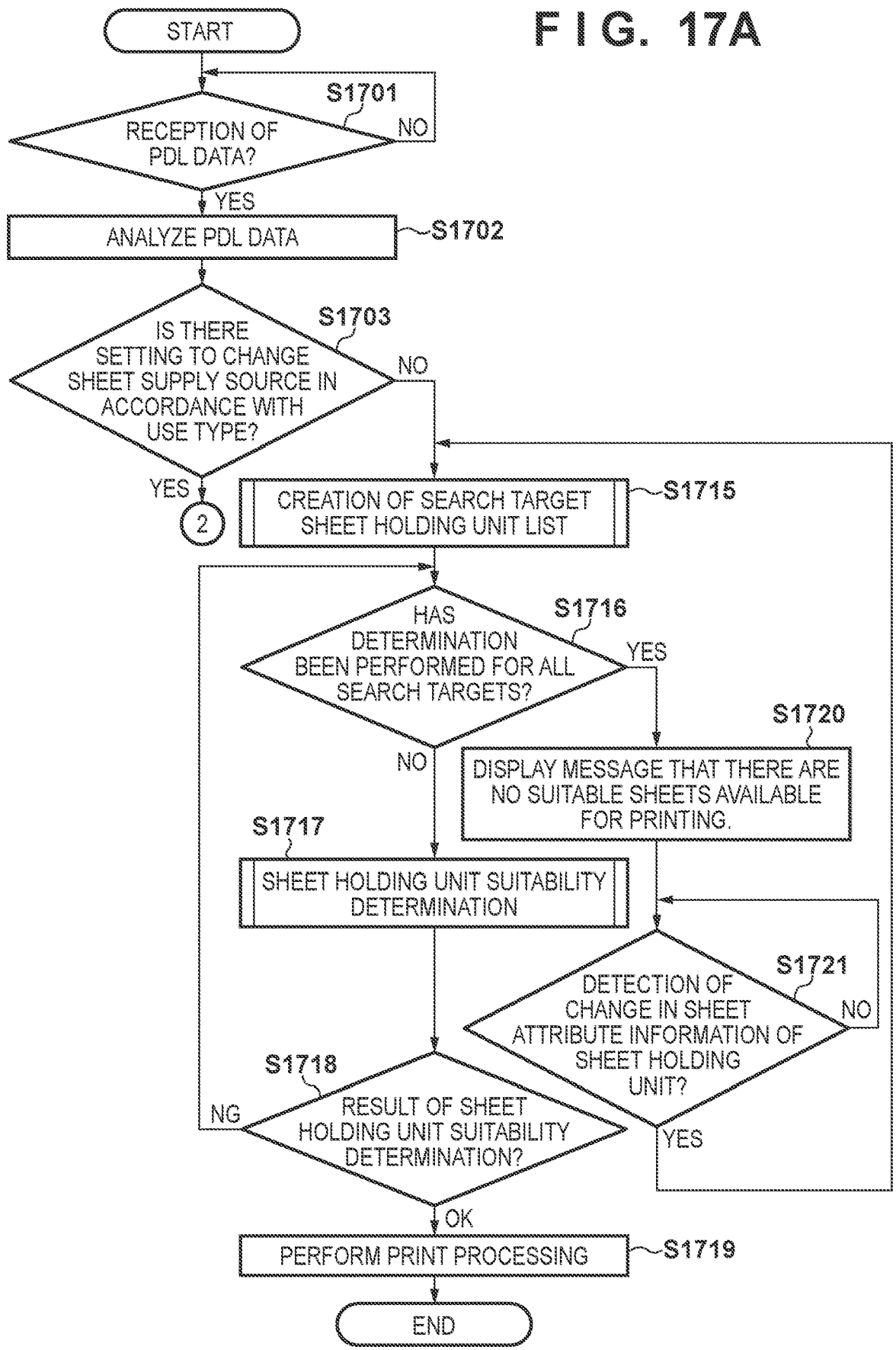
FIGS. 17A and 17B are flowcharts showing feed operation control processing.
Figure 17B:
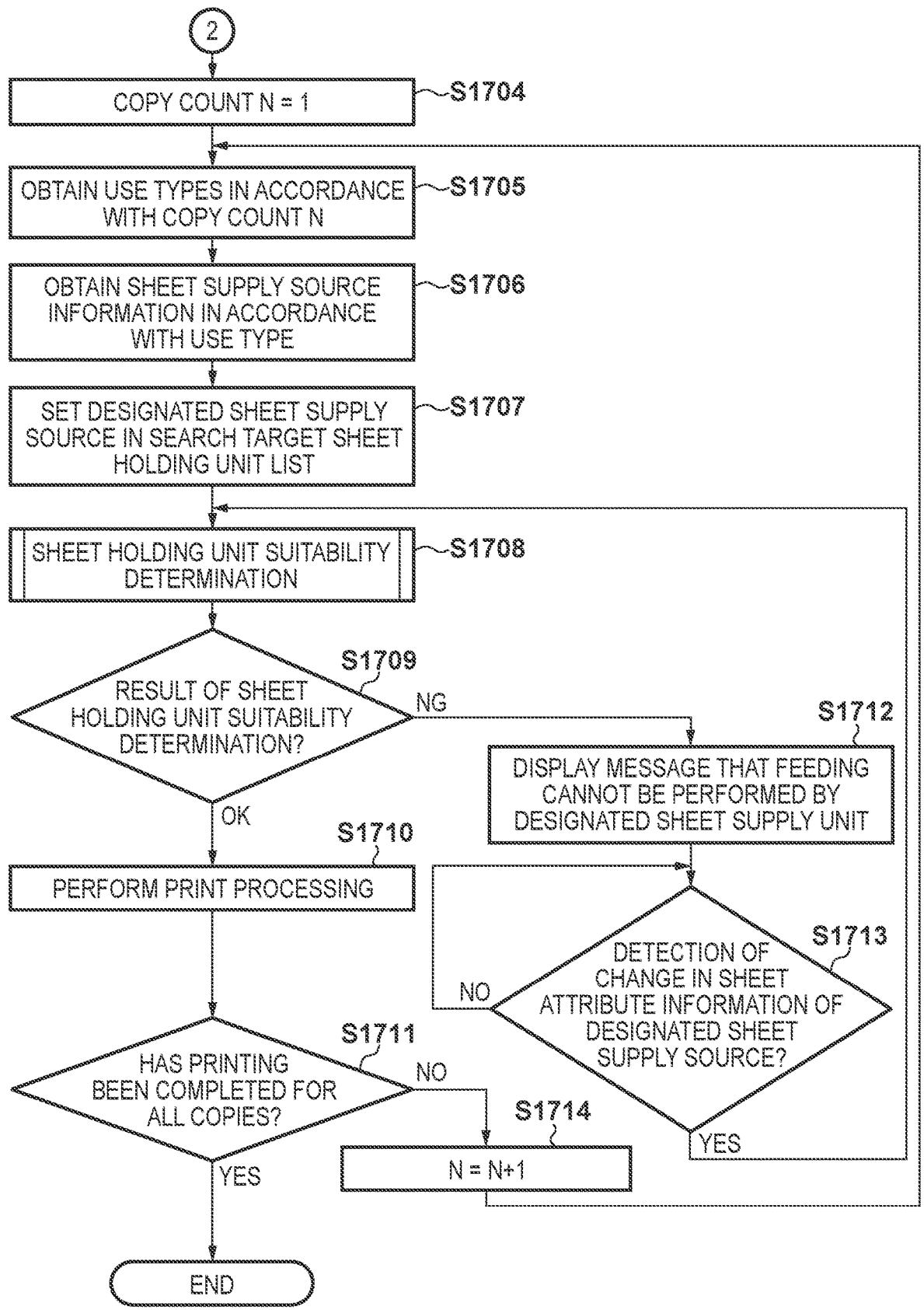

FIGS. 17A and 17B are flowcharts showing processing to control a feed operation by comparing the sheet set in a PDL job and the sheet of the sheet supply source at the execution of the PDL job in which the sheet supply source is switched in accordance with the use type. The processes of steps S1701 to S1706 are the same as those of steps S1001 to S1006 in FIG. 10, and a description thereof will be omitted.

In step S1707, a CPU 111 sets each obtained sheet supply source on a search target sheet holding unit list. In step S1708, the CPU 111 determines, for the search target sheet holding unit, whether a sheet size, a sheet direction, and a sheet type which allow the execution of printing of the received PDL data 600 have been set (sheet holding unit suitability determination). In step S1709, the CPU 111 switches the process to the next process in accordance with the determination result of step S1709. That is, if the determination result indicates "NG", the CPU determines that the printing of the received PDL data 600 cannot be executed by this sheet holding unit, and the process advances to step S1712. On the other hand, if the determination result indicates "OK", the CPU determines that the printing of the PDL data 600 can be executed by this sheet holding unit, and image printing processing corresponding to the sheet attribute information is performed in step S1710.

In step S1711, the CPU 111 determines whether all of the copies have been printed by comparing a counter N and the copy count 613 set in the PDL data 600. If it is determined that the all of the copies have been printed, the processing of FIGS. 17A and 17B ends. On the other hand, if it is determined that all of the copies have not been printed, the process advances to step S1714. In step S1714, the CPU 111 increments the counter N by 1 and repeats the process of step S1705.

On the other hand, if the determination result in step S1709 indicates "NG", the CPU 111 displays, in step S1712, a message indicating, on an operation unit 150, that there are no suitable sheets available for printing. Next, the process advances to step S1713, and the CPU 111 stands by until a change in the sheet attribute information of one of the sheet holding units is detected. When a change in the sheet attribute information is detected, the process of step S1708 is repeated. Here, a change in the sheet attribute information of a sheet holding unit indicates, for example, replacement of the sheets by a user. Processes in step S1715 and subsequent steps are the same as those in step S1214 and subsequent steps of FIGS. 12A and 12B, and a description thereof will be omitted.

Figure 16B:
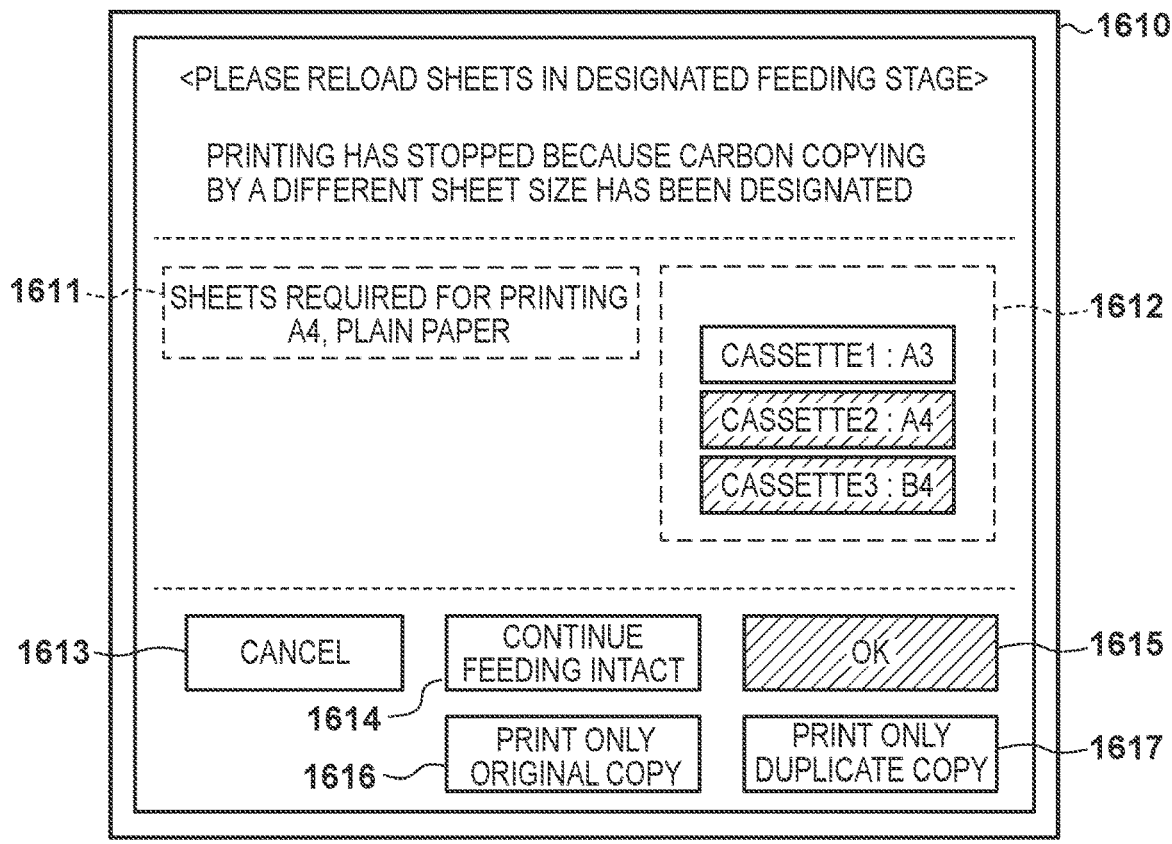

In this embodiment, a screen displayed in step S1712 may display a "print only original copy" key 1616 and a "print only duplicate copy" key 1617 shown in FIG. 16B. When each key is pressed, printing is continued by the sheet supply source designated for the original copy or for the duplicate copy even if the sheet size is different.

As described above, according to this embodiment, the sheet sizes/sheet type set for each use type in the job is compared with the sheet size/sheet type of each sheet supply source. As a result, even if a job is erroneously executed in a state in which sheets of a size unintended by the user are set in the sheet holding unit when the sheet supply source is to be switched in accordance with each use type, it is possible to prevent the output of an unsuitable printed product by stopping the feed operation before the feed operation.

Third Embodiment

Points different from those in the first and second embodiments will be described in the third embodiment hereinafter. For example, in the case of duplicate-copy printing, performing printing by using a sheet size which is not the same as that used for original-copy printing may not pose a problem as long as the original image data will not be partially absent. Also, depending on the user, the user may want to print on a sheet of a size larger than the output sheet size designated by a job so that a part of the printed product may intentionally have a margin to be used for memo taking.

In this embodiment, in a case where the original image data will not be partially absent, printing is continued without stopping. As a result, in a case where it is not a problem to print on a sheet of a sheet size which is not same as that of the original copy, the user need not prepare sheets of the same size, and the load on the user can be reduced. Also, in a case where user intentionally wants to perform printing by a sheet size which is larger than the output sheet size of the job, it can prevent the occurrence of an unintended print stop operation.

Figure 18A:
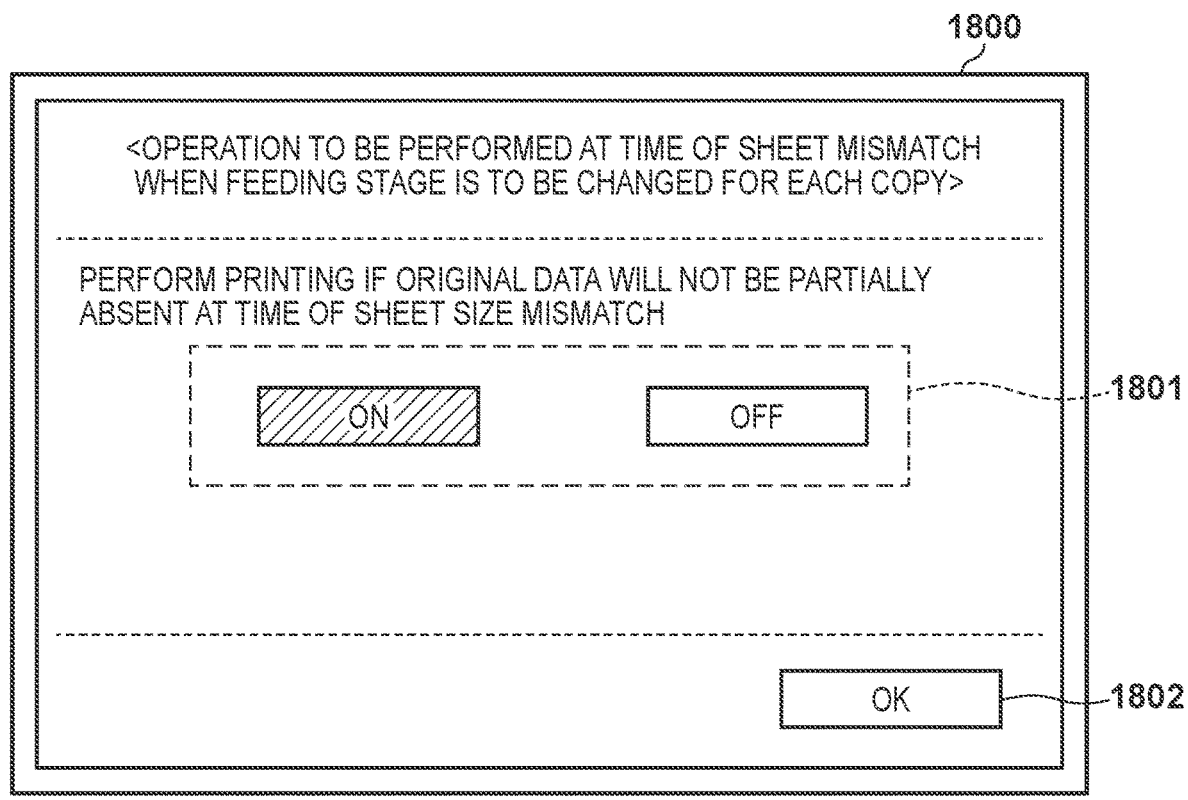
FIGS. 18A and 18B are views each showing a setting screen.
Figure 18B:
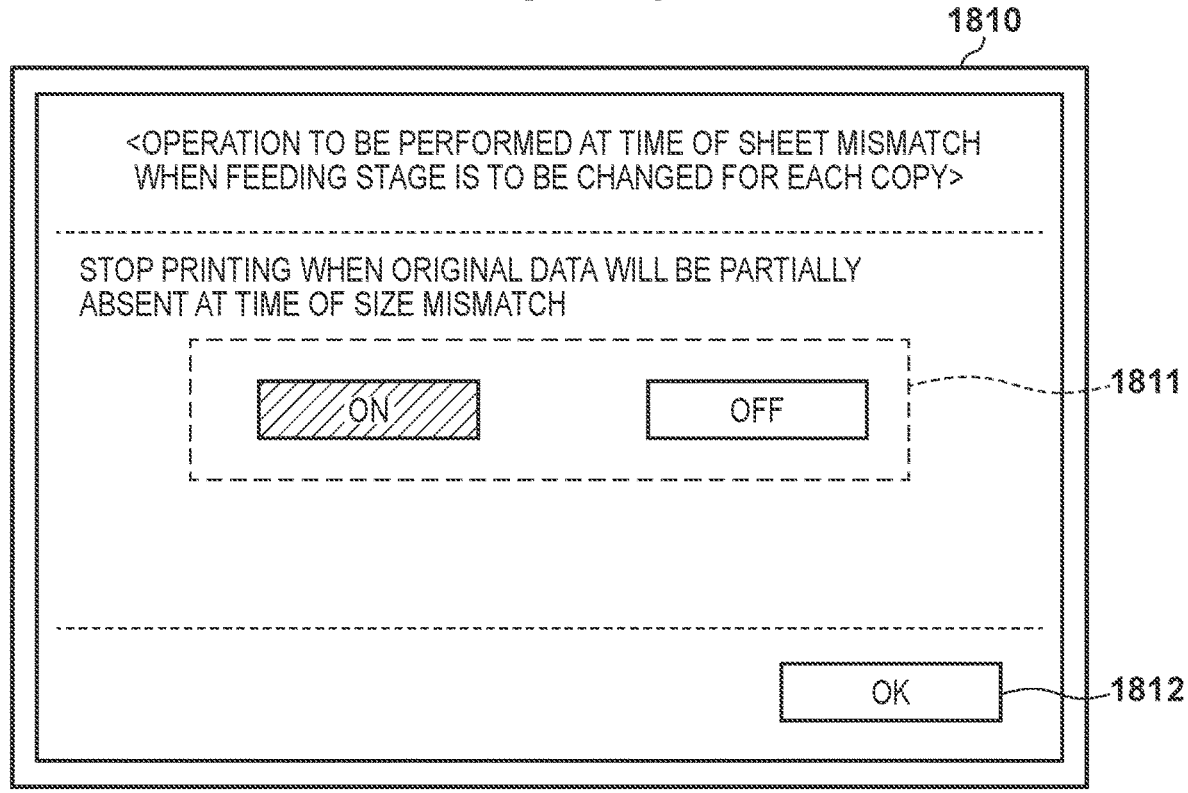

FIGS. 18A and 18B are views showing examples of a setting screen, which is displayed on an operation unit 150, for switching the operation when the sheet size set in the job at the time of feeding stage change for each copy and the sheet size set in the sheet supply source do not match. "ON" and "OFF" keys shown in an area 1801 of a setting screen 1800 accept settings as to whether printing is to be executed as long as the original data will not be partially absent at the time of sheet size mismatch. This example shows state in which the "ON" key is pressed. An OK key 1802 is pressed when the setting operation is to be ended. When the setting operation ends, setting contents indicating as to whether printing is to be executed as long as the original data will not be partially absent are stored in a ROM 113.

In the same manner, a setting screen 1810 shows an example of a setting screen for switching the operation when the sheet size set in the job at the time of feeding stage change for each copy and the size of the sheet supply source do not match. "ON" and "OFF" keys shown in an area 1811 in the setting screen 1810 accept settings as to whether printing is to be stopped if the original data will be partially absent at the time of sheet size mismatch. This example shows a state in which the "ON" key is pressed. An OK key 1812 is pressed when the setting operation is to be ended. When the setting operation ends, setting contents indicating as to whether printing is to be executed or stopped if the original data will be partially absent at the time of sheet size mismatch are stored in a ROM 113.

Figure 19A:
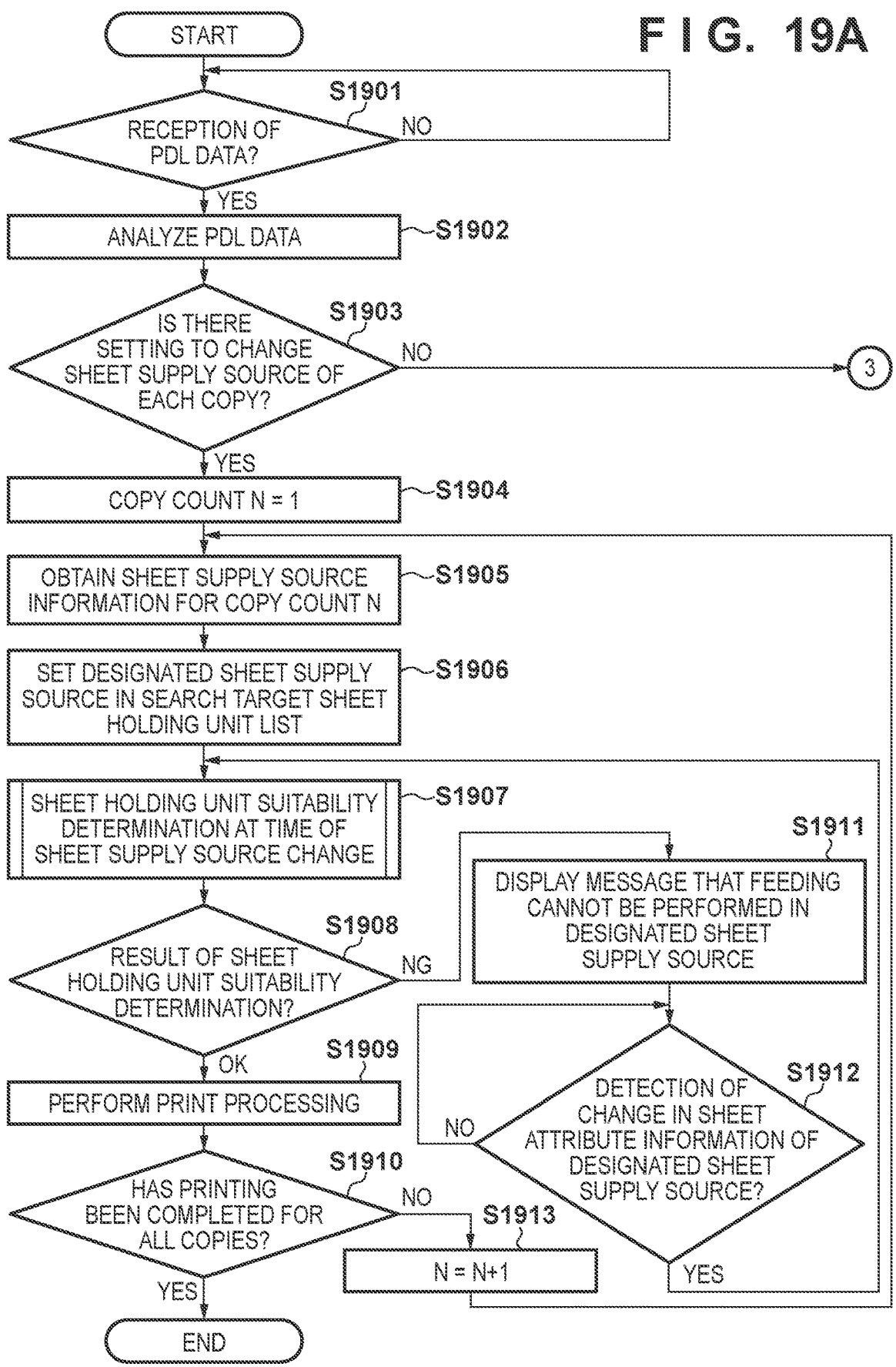
FIGS. 19A and 19B are flowcharts showing feed operation control processing.
Figure 19B:
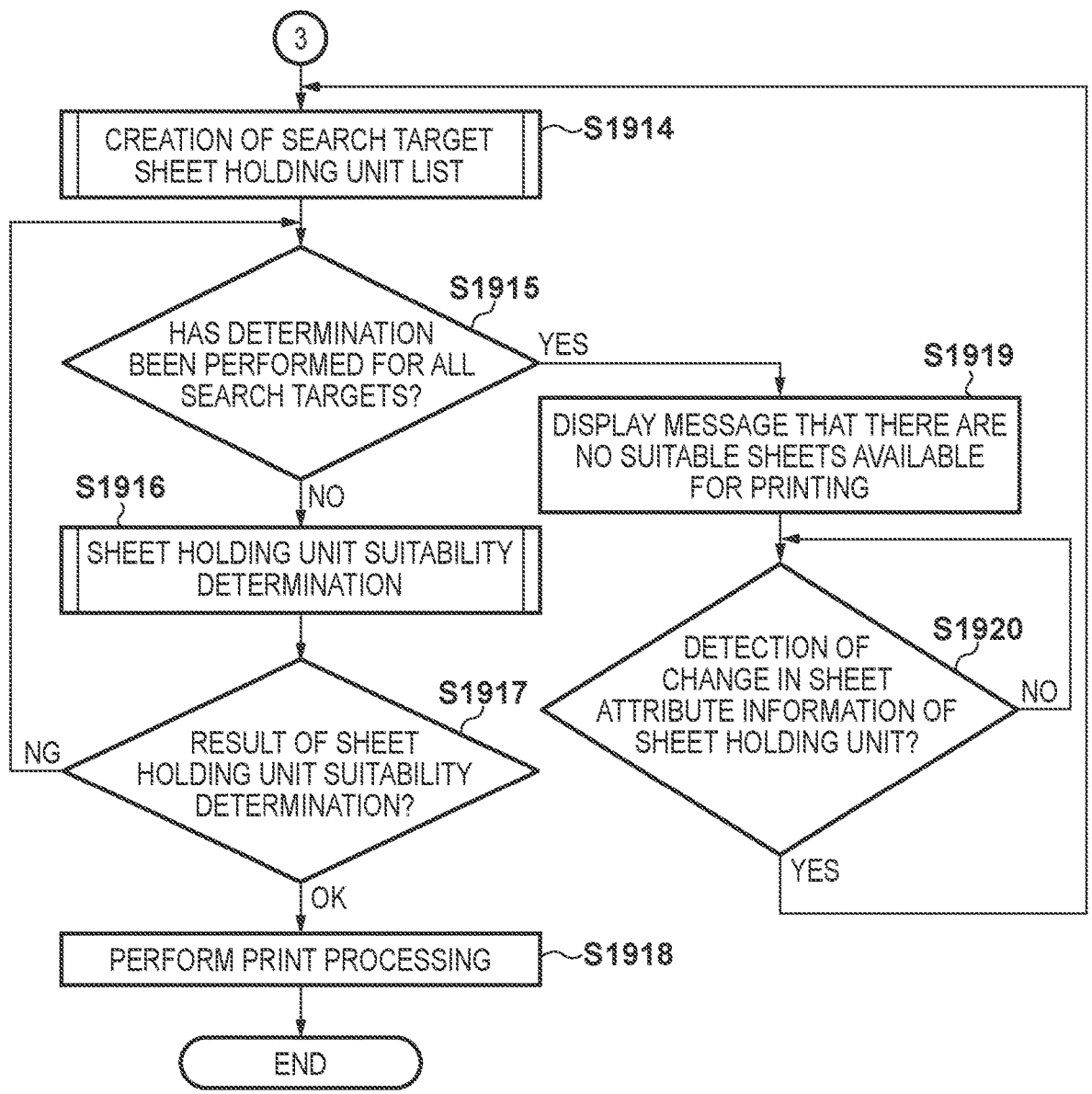

FIGS. 19A and 19B are flowcharts showing processing to control a feed operation by comparing the sheet set in a PDL job and the sheet of a sheet supply source at the execution of the PDL job in which the sheet supply source is switched for each copy according to this embodiment. The processes of steps S1901 to S1905 are the same as those of steps S901 to S905, and a description thereof will be omitted.

In step S1906, the CPU 111 sets each obtained sheet supply source on a search target sheet holding unit list. In step S1907, the CPU 111 determines, for the search target sheet holding unit, whether a sheet size, a sheet direction, and a sheet type which allow the execution of printing of the received PDL data 600 have been set (sheet holding unit suitability determination). In step S1908, the CPU switches the process to the next process in accordance with the determination result. That is, if the determination result indicates "NG", the CPU determines that the printing of the received PDL data 600 cannot be executed by this sheet holding unit, and the process advances to step S1911. On the other hand, if the determination result indicates "OK", the CPU determines that the printing of the PDL data 600 can be executed by this sheet holding unit, and image printing processing corresponding to the sheet attribute information is performed in step S1909.

In step S1910, the CPU 111 determines whether all of the copies have been printed by comparing a counter N and a copy count 613 set in the PDL data 600. If it is determined that the all of the copies have been printed, the processing of FIGS. 19A and 19B ends. On the other hand, if it is determined that all of the copies have not been printed, the process advances to step S1913. In step S1913, the CPU 111 increments the counter N by 1 and repeats the process of step S1905.

If the determination result indicates "NG" in step S1908, the CPU 111 displays, in step S1911, a message indicating, on the operation unit 150, that there are no suitable sheets available for printing. Next, the process advances to step S1912, and the CPU 111 stands by until a change in the sheet attribute information of one of the sheet holding units is detected. If a change in the sheet attribute information is detected, the process of step S1907 is repeated. Here, a change in the sheet attribute information indicates, for example, replacement of the sheets by the user. Processes of step S1914 and its subsequent steps are the same as those of steps S1214 and its subsequent steps in FIGS. 12A and 12B, and a description there of will be omitted.

Figure 20:
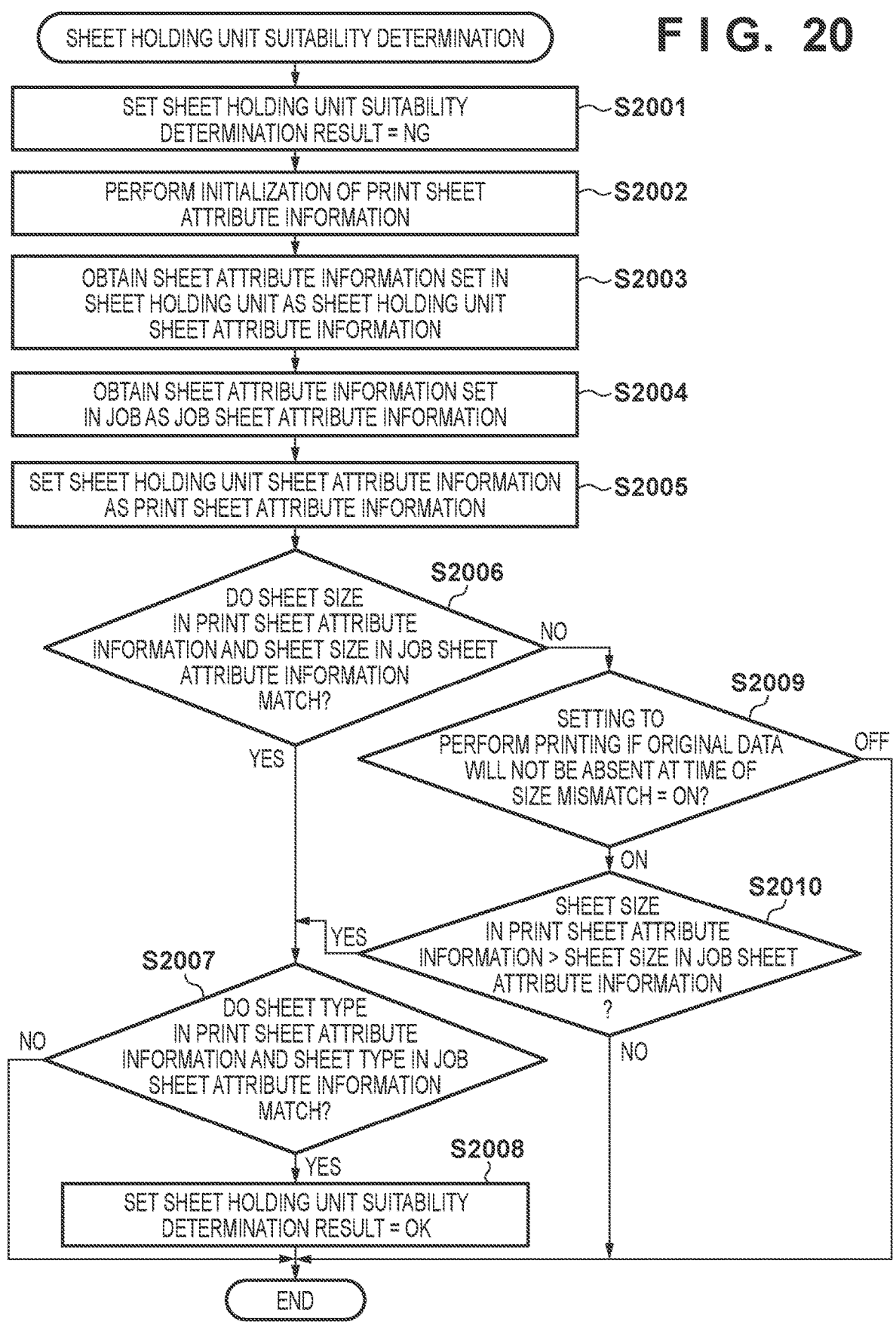
FIG. 20 is a flowchart showing sheet holding unit suitability determination processing.

Next, the sheet holding unit suitability determination processing performed in step S1907 will be described with reference to FIG. 20. FIG. 20 is a flowchart of a case where settings are made by using the setting screen 1800 of FIG. 18A. In step S2001, the CPU 111 initializes the value of a variable representing the sheet holding unit suitability determination result by setting "NG". Next, in step S2002, the CPU 111 initializes the variables of print sheet attribute information formed from the sheet size, the sheet direction, and the sheet type which are to be used in the sheet holding unit suitability determination.

Next, in step S2003, the CPU 111 obtains, as the sheet holding unit sheet attribute information, the sheet attribute information which is stored in the ROM 113 for the sheet holding unit that has been designated as the search target. In step S2004, the CPU 111 obtains the sheet attribute information set in the print job as the job sheet attribute information. For example, in the case of a PDL job, the CPU 111 obtains, as the job sheet attribute information, a sheet size 615, a sheet direction 616, and a sheet type 617 set in the PDL data 600. Here, if the sheet direction 616 has not been set, assume that the sheet size 615 will be used as a supplement.

Next, in step S2005, the CPU 111 sets, as the print sheet attribute information initialized in step S2002, the sheet holding unit sheet attribute information obtained in step S2003. In step S2006, the CPU 111 compares the sheet size set in the sheet holding unit sheet attribute information and the sheet size set in the job sheet attribute information. If it is determined that the sheet sizes match, the process advances to step S2007, and the CPU 111 compares, in the same manner as the sheet sizes, the sheet type set in the sheet holding unit sheet attribute information and the sheet type set in the job sheet attribute information. If the sheet type is not set in the job sheet attribute information, the process of step S2007 may be omitted. If there is no sheet type designation in the print job in advance, the determination may be performed by determining whether the sheet type set as a feed permitted sheet has been set in the sheet holding unit sheet attribute information. If it is determined that the comparison result does not indicate a match step S2007, it is determined that the print job cannot be executed by the sheet of the sheet holding unit of interest, and the processing of FIG. 20 ends. On the other hand, if the comparison result indicates a match, the process advances to step S2008, and the CPU 111 sets "OK" as the value of the variable representing the sheet holding unit suitability determination result, and the processing of FIG. 20 ends.

If it is determined in step S2006 that the comparison result does not indicate a match, the process advances to step S2009, and the CPU 111 determines whether a setting, which has been made by using the setting screen 1800, to perform printing as long as the original data will not be partially absent at the time of sheet size mismatch is set to "ON". If it is determined that the setting is set to "ON", the process advances to step S2010. Otherwise, the processing of FIG. 20 ends.

In step S2010, the CPU 111 compares the sheet size set in the sheet holding unit sheet attribute information and the sheet size set in the job sheet attribute information. If it is determined that the sheet size set in the sheet holding unit sheet attribute information is larger than that in the job sheet attribute information, the process advances to step S2007. On the other hand, if it is determined that the sheet size set in the sheet holding unit sheet attribute information is smaller than that in the job sheet attribute information, the processing of FIG. 20 ends.

The tray of each sheet holding unit may be designated as a tray for original-copy printing or a tray for duplicate-copy printing. Here, in the sheet holding units, assume that an original copy sheet tray and a duplicate copy sheet tray have been set as a tray 1 and tray 2, respectively, and that corresponding sheets have been set to the respective trays by a printer driver of a PC 160. For example, a multi-function peripheral determines, by seeing the print job attribute, whether a carbon-copy operation has been designated for that job. If it is determined that it is a carbon-copy job, sheets for the first copy are fed from the tray 1. If the sheet sizes do not match, the job is stopped. Here, if printing of a duplicate copy has been set for the printing of the second copy, and if sheets for the second copy (duplicate) are fed from the tray 2, it is possible to perform control so that the printing will be continued under a predetermined condition even if the size of sheets in the tray 2 and the sheet size of the job do not match. That is, instead of performing input from the operation unit, it may be set, at the time of shipment from the factory, so that the setting used in step S2009 will be set to "ON" when feeding from the tray for duplicate-copy printing is determined and will be set to "OFF" when feeding from the tray for original-copy printing is determined. In this case, the tray 1 can be set so that feeding will be prohibited unless one or both of at least the sheet sizes and the sheet types match those set in the job. Also, for example, when feeding is performed from the tray 2, the following predetermined conditions may be considered. For example, it may be set so that a feed operation is permitted if printing can be contained in the set sheet by changing the size of the image even at the time of sheet size mismatch, or it may be set to continue a feed operation by requiring the sheet sizes to match but not requiring sheet types to match. In addition, other conditions further shown in FIG. 23 may be used.

Figure 21:
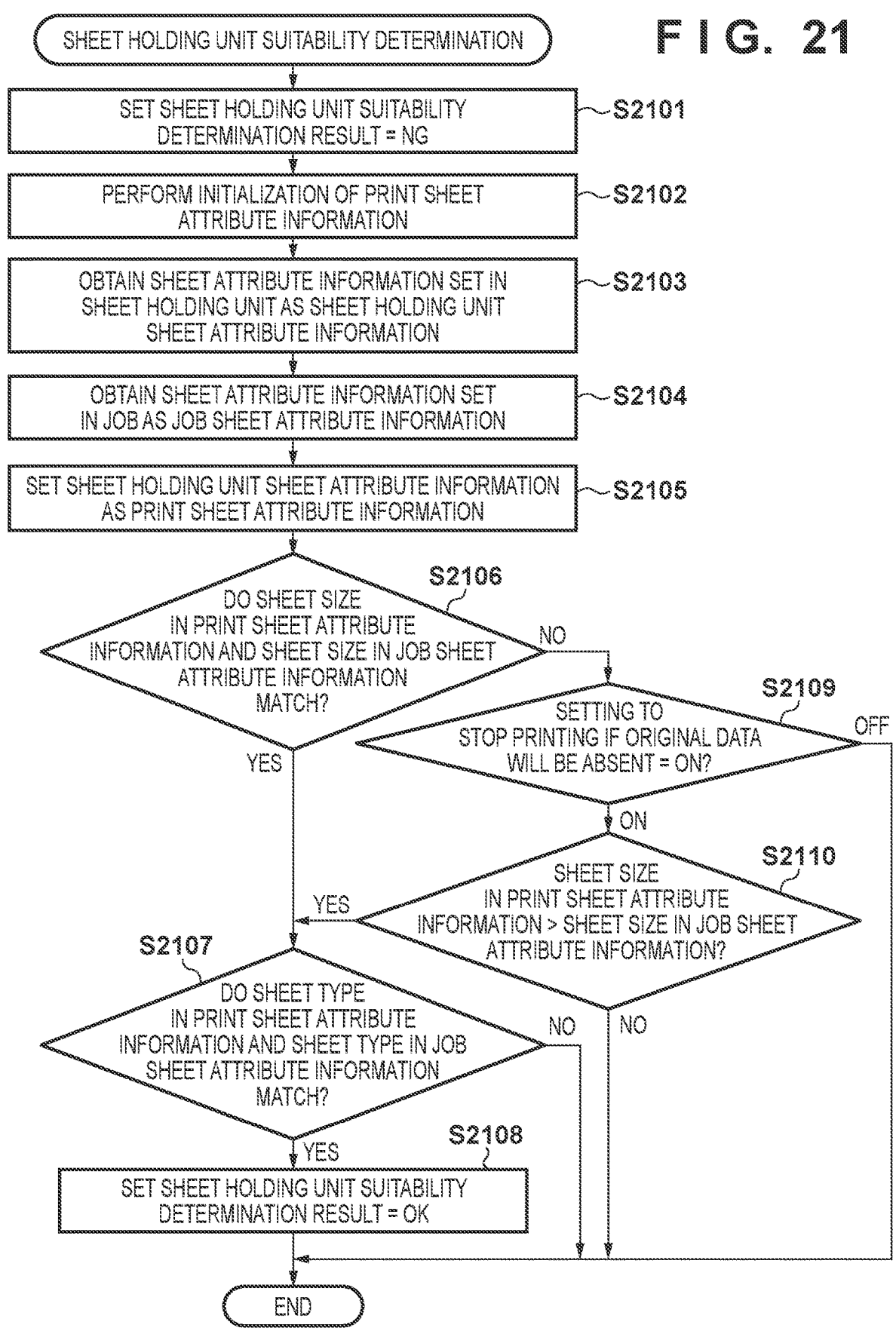
FIG. 21 is a flowchart showing the sheet holding unit suitability determination processing.

FIG. 21 is a flowchart of a case where settings are made by using the setting screen 1810 shown in FIG. 18B. Processes other than the process of step S2109 are the same as those of FIG. 20, and a description thereof will be omitted. In step S2109, the CPU 111 determines whether the setting, which has been made using the setting screen 1810, to stop printing if the original data becomes partially absent at the time of sheet size mismatch is set to "ON". If it is determined that the setting is set to "ON", the process advances to step S2110. Otherwise, the processing of FIG. 21 ends.

As described above, according to this embodiment, even in a case where the sheet size set in the job and the sheet size of the sheet supply source do not match, printing can be performed without having to stop before the feed operation as long as the original image data will not be damaged.

Fourth Embodiment

Points different from those of the first to third embodiments will be described in the fourth embodiment hereinafter. In the fourth embodiment, in a case where sheet supply sources are switched in accordance with the use types such as original-copy printing and duplicate-copy printing, instead of switching the sheet supply source for each copy, printing is continued without stopping as long as the original image data will not be damaged.

In this embodiment, information of sheet supply sources corresponding to the respective use types is included in PDL data 600. With respect to a copy count 613, information as to which copy is to be printed as the original copy and which copy is to be printed as the duplicate copy may be added to the PDL data 600. In a case where such information is unavailable, a determination is made to set the first copy as the original copy and set each subsequent copy as a duplicate copy by default.

Figure 22A:
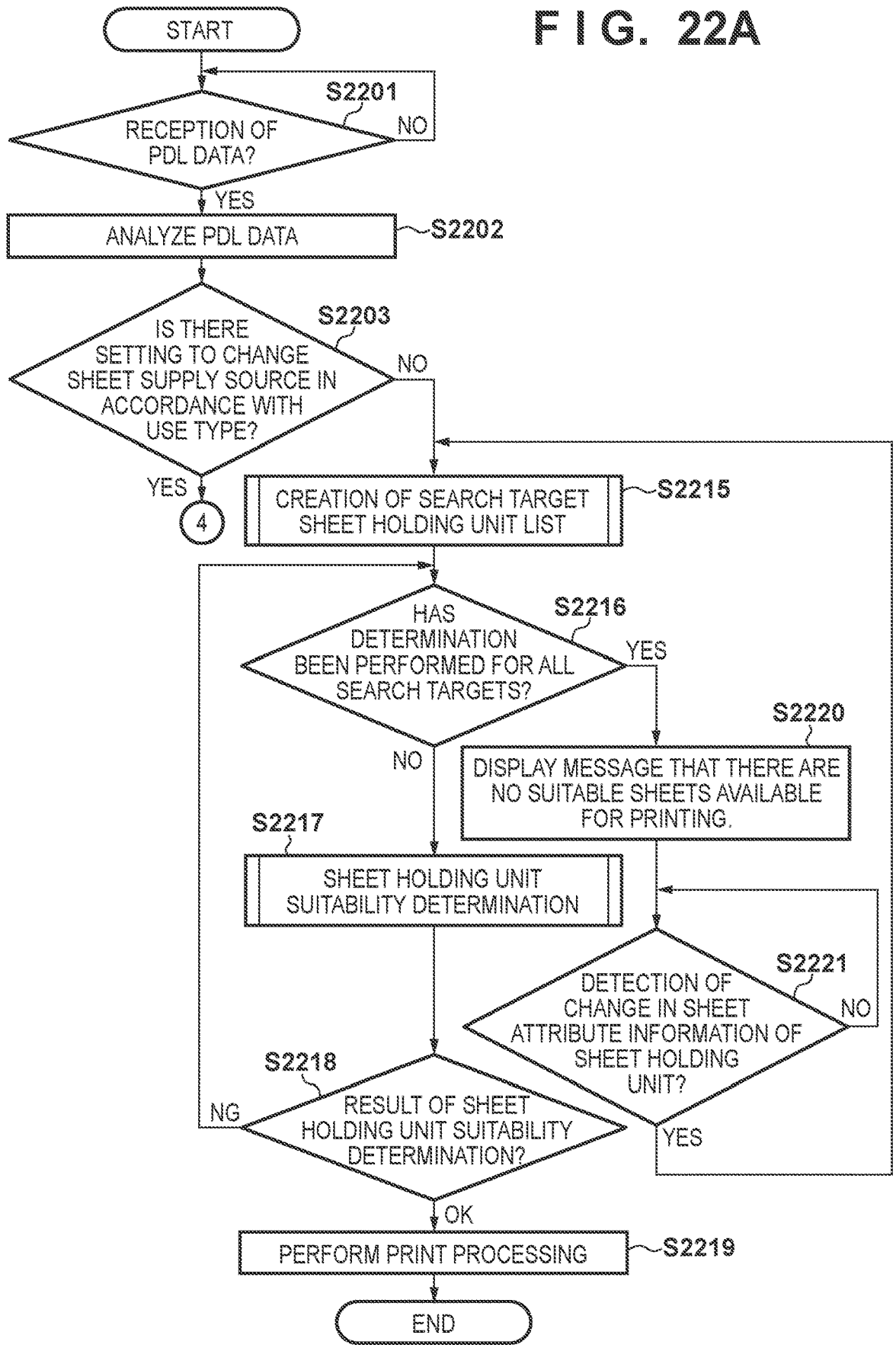
FIGS. 22A and 22B are flowcharts showing feed operation control processing.
Figure 22B:
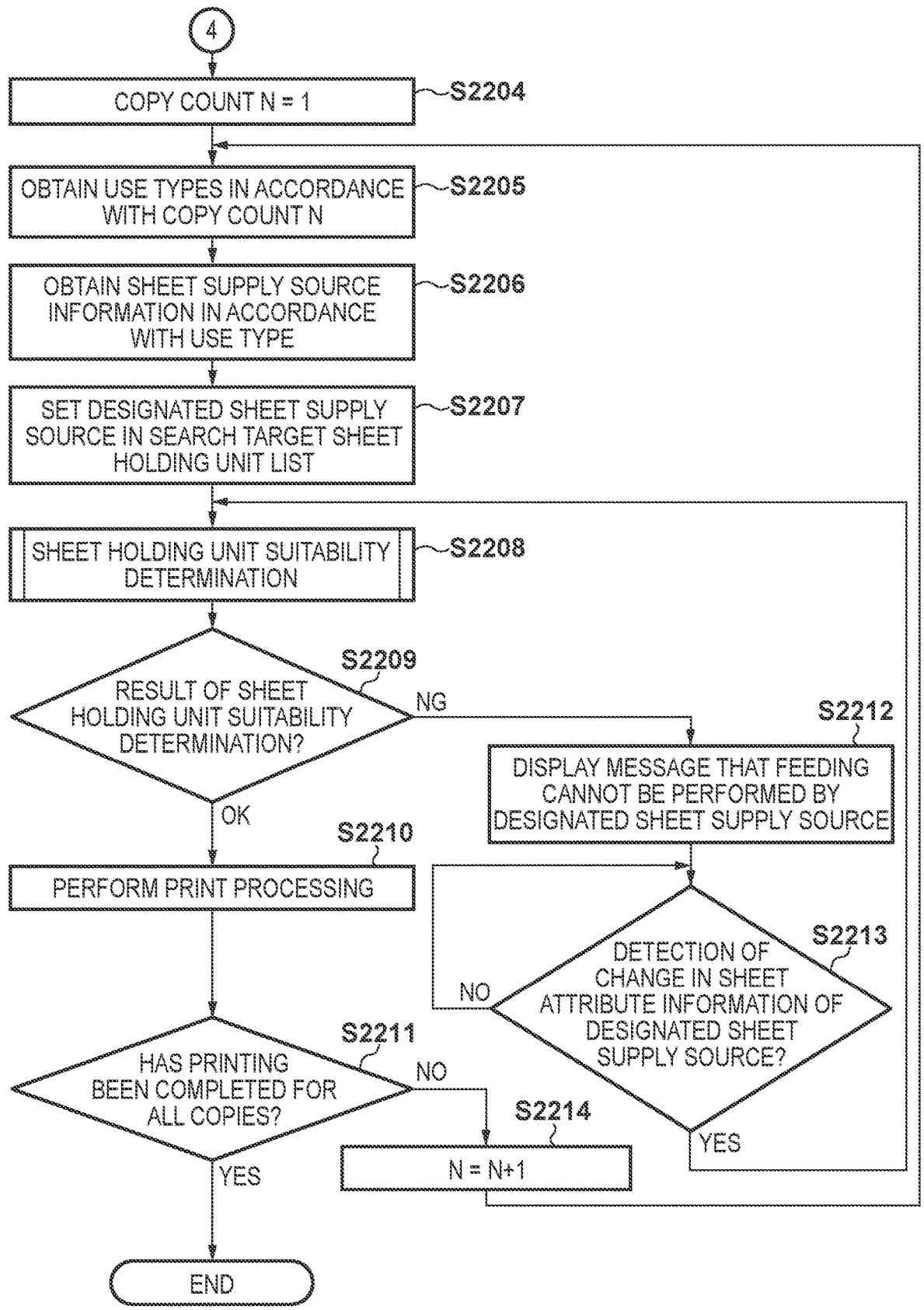

FIGS. 22A and 22B are flowcharts showing processing to control a feed operation by comparing the sheet set in a PDL job and the sheet of the sheet supply source at the execution of the PDL job in which the sheet supply source is switched in accordance with the use type. The processes of steps S2201 to S2206 are the same as those of steps S1001 to S1006 in FIG. 10, and a description thereof will be omitted.

In step S2207, a CPU 111 sets the obtained sheet supply source on a search target sheet holding unit list. In step S2208, the CPU 111 determines, for the search target sheet holding unit, whether a sheet size, a sheet direction, and a sheet type which allow the execution of printing of the received PDL data 600 have been set (sheet holding unit suitability determination). In step S2209, the CPU 111 switches the process to the next process in accordance with the determination result of step S2208. That is, if the determination result indicates "NG", the CPU determines that the printing of the received PDL data 600 cannot be executed by this sheet holding unit, and the process advances to step S2212. On the other hand, if the determination result indicates OK, the CPU determines that the printing of the PDL data 600 can be executed by this sheet holding unit, and image printing processing corresponding to the sheet attribute information is performed in step S2210.

In step S2211, the CPU 111 determines whether all of the copies have been printed by comparing a counter N and the copy count 613 set in the PDL data 600. If it is determined that the all of the copies have been printed, the processing of FIGS. 22A and 22B ends. On the other hand, if it is determined that all of the copies have not been printed, the process advances to step S2214. In step S2214, the CPU 111 increments the counter N by 1 and repeats the process of step S2205.

On the other hand, if the determination result in step S2209 indicates "NG", the CPU 111 displays, in step S2212, a message indicating, on an operation unit 150, that there are no suitable sheets available for printing. Next, the process advances to step S2213, and the CPU 111 stands by until a change in the sheet attribute information of one of the sheet holding units is detected. When a change in the sheet attribute information is detected, the process of step S2208 is repeated. Here, a change in the sheet attribute information of a sheet holding unit indicates, for example, replacement of the sheets by a user. Processes in step S2215 and subsequent steps are the same as those in step S1914 and subsequent steps of FIGS. 19A and 19B, and a description thereof will be omitted.

As described above, according to this embodiment, even in a case where the sheet size/sheet type set in the job and the sheet size/sheet type of the sheet supply source do not match, printing can be performed without stopping before the feed operation as long as the original image data will not be damaged.

Fifth Embodiment

Points different from those in the first to fourth embodiments will be described for the fifth embodiment hereinafter. In the fifth embodiment, in a case where the sheet size set in a job for each copy and the sheet size of each sheet supply source do not match, the image data size is changed in accordance with the sheet size of the corresponding sheet supply source so that printing is performed without stopping.

Figure 23:
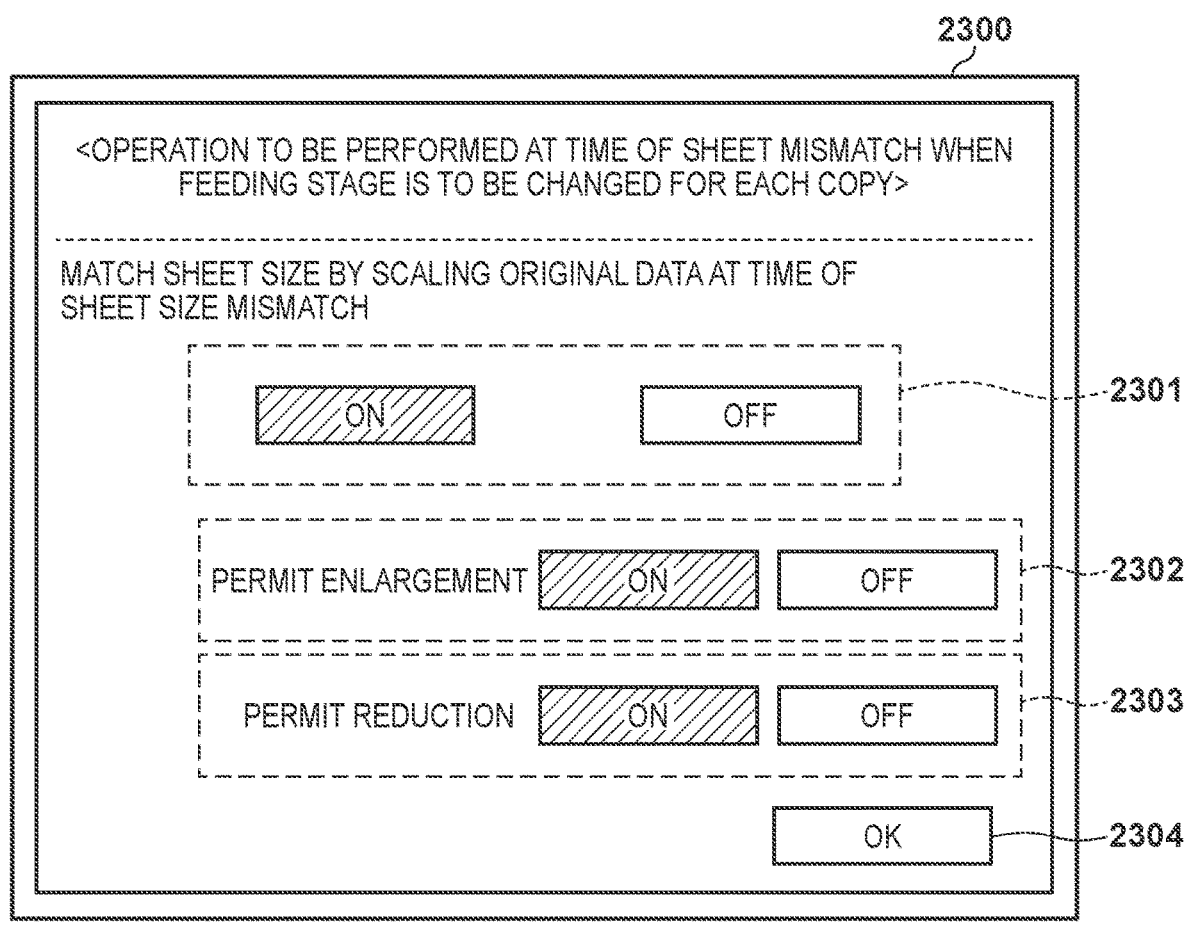
FIG. 23 shows a setting screen.

FIG. 23 is a view showing an example of a setting screen, which is displayed on an operation unit 150, for switching the operation in a case where a sheet size set in a job at the time of feeding stage change for each copy and the size of the sheet supply source do not match. "ON" and "OFF" keys shown in an area 2301 of a setting area 2300 accept whether printing is to be executed by scaling the original data at the time of sheet size mismatch. This example shows a state in which "ON" has been pressed. When scaling is to be performed by using the "ON" and "OFF" keys in an area 2302, setting as to whether size enlargement printing will be permitted is accepted. When scaling is to be performed by using the "ON" and "OFF" keys in an area 2303, setting as to whether reduction printing will be permitted is accepted. An "OK" key 2304 is pressed to complete the setting operation. When the settings have been completed, setting contents such as the setting as to whether to perform scaling of the original data at the time of sheet size mismatch and the settings as to permit size enlargement and size reduction when scaling setting is to be performed are stored in a ROM 113.

Figure 24A:
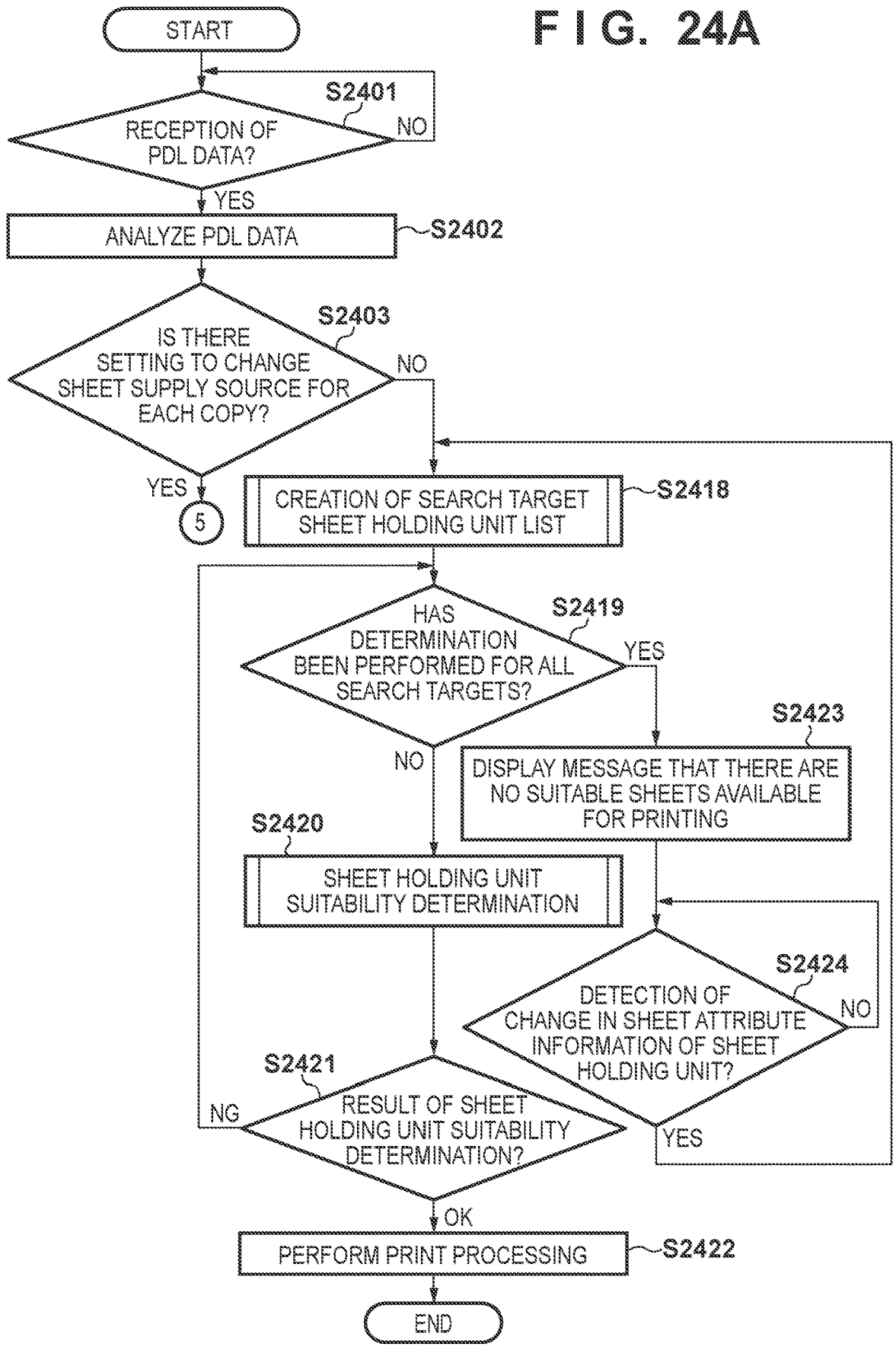
FIGS. 24A and 24B are flowcharts showing feed operation control processing.
Figure 24B:
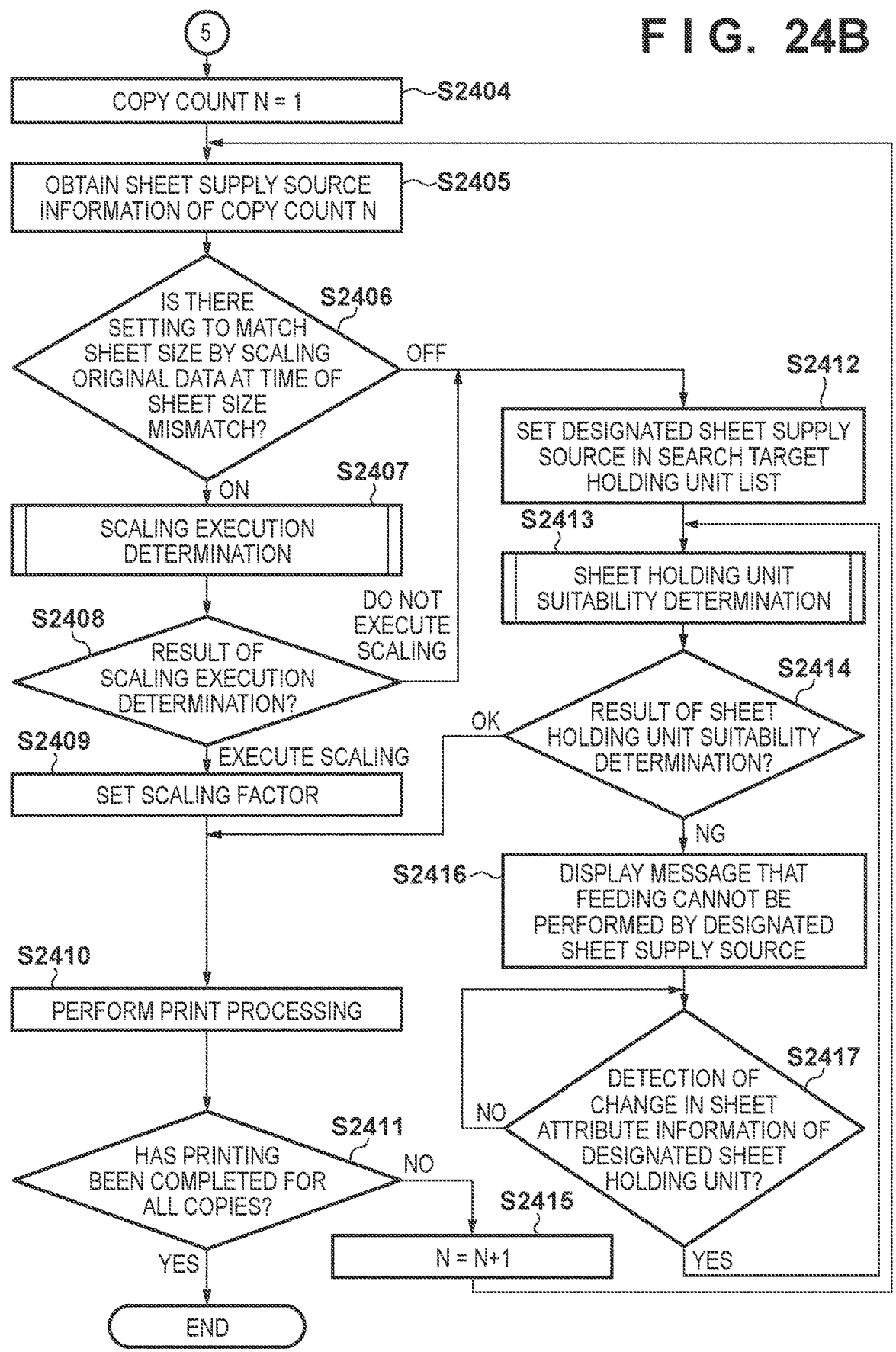

FIGS. 24A and 24B are flowcharts showing processing to control a feed operation by comparing the sheet set in a PDL job and the sheet of the sheet supply source at the execution of the PDL job in which the sheet supply source is switched for each copy according to this embodiment. The processes of steps S2401 to S2405 are the same as those of steps S901 to S905, and a description thereof will be omitted.

In step S2406, a CPU 111 determines whether the setting, which is set by using the setting screen 2300, to execute printing by scaling the original data at the time of sheet size mismatch has been set to "ON". If it is determined that the setting is set to "ON", the process advances to step S2407. Otherwise, the process advances to step S2412.

In step S2407, the CPU 111 determines whether scaling is necessary by comparing the sheet size set in the job and the sheet size of the sheet supply source. This determination is performed by referring to the values of the variables of a scaling execution determination result. In step S2408, the process is switched to the next process in accordance with the determination result. If the scaling execution determination result indicates that execution of scaling is necessary, the process advances to step S2409. On the other hand, if the scaling execution determination result indicates that execution of scaling is not necessary, the process advances to step S2412. In step S2409, the CPU 111 obtains the scaling factor based on the sheet size set in the job and the sheet size of the sheet supply source and sets a scaling factor. For example, "the sheet size of the sheet supply source÷ the sheet size set in the job" is calculated as the scaling factor.

In step S2410, the CPU 111 performs image printing processing corresponding to the sheet attribute information. If the scaling factor has been set in step S2409, the CPU 111 performs scaling and image printing processing. Processes of step S2411 and subsequent steps are the same as those of step S1910 and subsequent steps in FIGS. 19A and 19B, and a description thereof will be omitted.

Figure 25B:
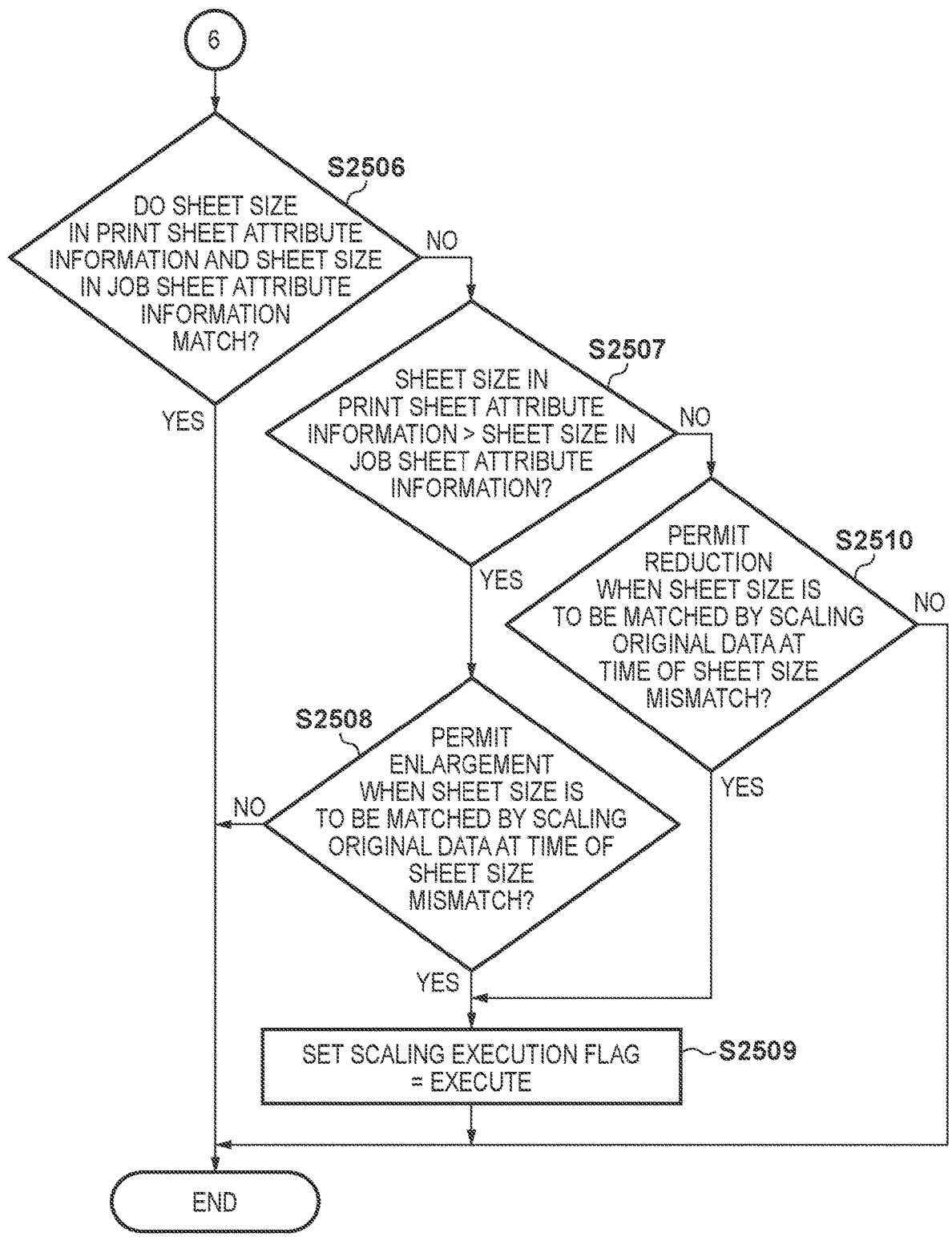

The scaling execution determination processing in step S2407 will be described next with reference to FIGS. 25A and 25B. In step S2501, the CPU 111 initializes the value of a variable representing the scaling execution determination result by setting "do not execute".

Next, in step S2502, the CPU 111 initializes the values of the variables formed from the sheet size, the sheet direction, and the sheet type which are to be used in the sheet holding unit suitability determination. Next, in step S2503, the CPU 111 obtains, as the sheet holding unit sheet attribute information, the sheet attribute information, which is stored in the ROM 113, of the sheet holding unit that has been designated as the search target. In step S2504, the CPU 111 obtains the sheet attribute information set in the print job as the job sheet attribute information. For example, in the case of a PDL job, the CPU 111 obtains, as the job sheet attribute information, a sheet size 615, a sheet direction 616, and a sheet type 617 set in PDL data 600. Here, if the sheet direction 616 has not been set, it is supplemented by the sheet size 615.

Next, in step S2505, the CPU 111 sets, as the print sheet attribute information initialized in step S2502, the sheet holding unit sheet attribute information obtained in step S2503. In step S2506, the CPU 111 compares the sheet size set in the sheet holding unit sheet attribute information and the sheet size set in the job sheet attribute information. If it is determined that the sheet sizes match, the processing of FIGS. 25A and 25B ends. If it is determined in step S2506 that the sheet sizes do not match in the comparison result, the process advances to step S2507, and the CPU 111 determines whether the sheet size set in the sheet holding unit sheet attribute information is larger than the sheet size set in the job sheet attribute information. If it is determined that the sheet size set in the sheet holding unit sheet attribute information is larger, the process advances to step S2508, and the CPU 111 determines whether the setting which is set by using the setting screen 2300 and permits size enlargement at the time of sheet size mismatch is set to "ON". If it is determined that the setting is "ON", the process advances to step S2509. Otherwise, the processing of FIGS. 25A and 25B ends.

In step S2509, the CPU 111 sets "execute" as the variable representing the scaling execution determination result. In step S2507, if it is determined that the sheet size of the sheet holding unit sheet attribute information is smaller than the sheet size of the job sheet attribute information, the process advances to step S2510. In step S2510, the CPU 111 determines whether the setting which is set by using the setting screen 2300 and permits size reduction at the time of sheet size mismatch is set to "ON". If it is determined that the setting is set to "ON", the process advances to step S2509. Otherwise, the processing of FIGS. 25A and 25B ends.

As described above, according to this embodiment, even in a case where the sheet size set in the job and the sheet size of the sheet supply source do not match, scaling processing is executed by matching the original image data to the sheet size of the sheet holding unit. As a result, printing can be performed without stopping before the feed operation.

Sixth Embodiment

Points different from those of the first to fifth embodiments will be described for the sixth embodiment hereinafter. In the sixth embodiment, when the sheet size set for each use type and the sheet size set for each sheet supply do not match in a case where sheet supply sources are to be switched in accordance with the respective use types such as original-copy printing and duplicate-copy printing, printing is performed by scaling the image data size in accordance with the sheet size of the corresponding sheet supply source.

Figure 26A:
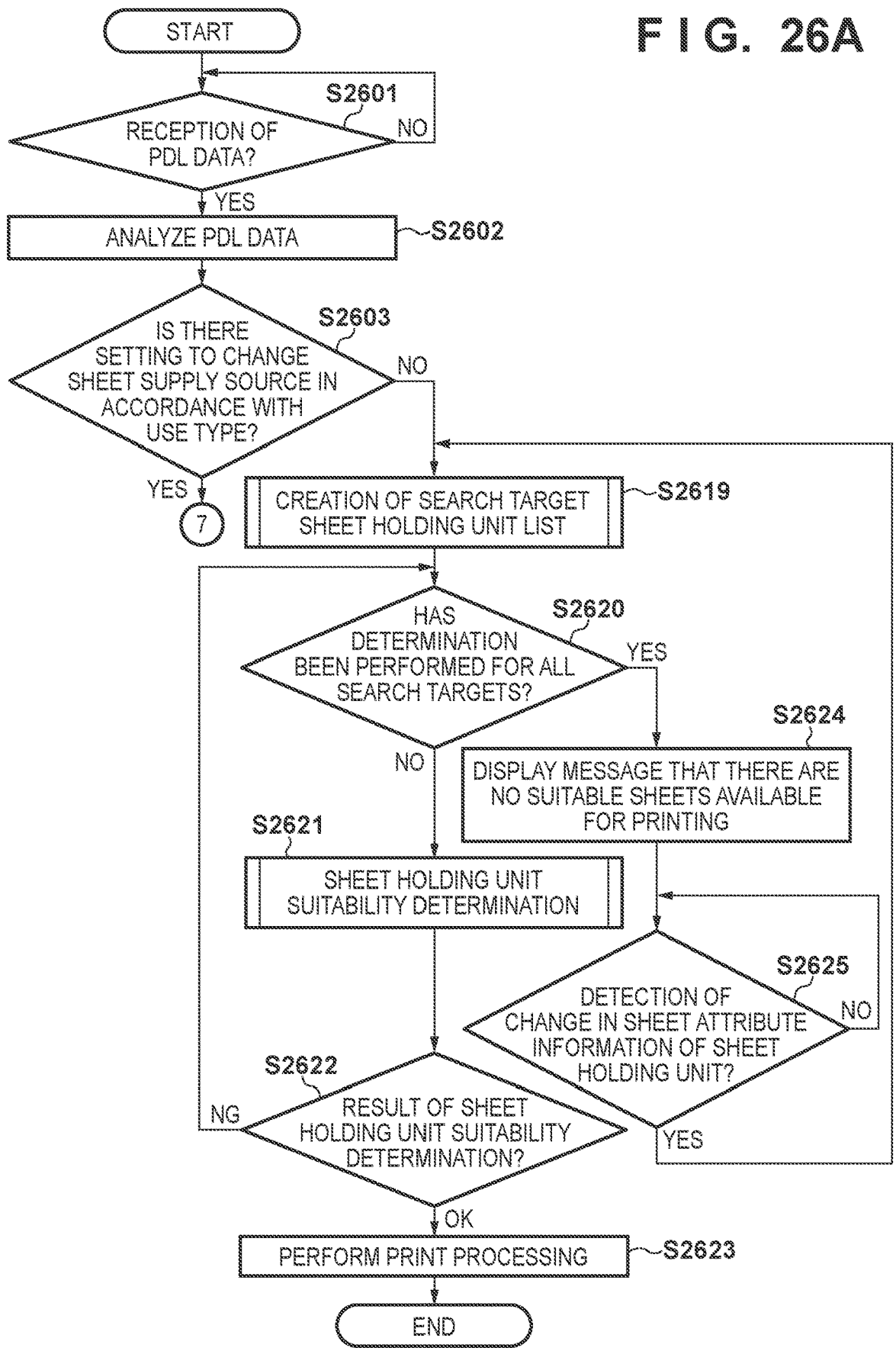
FIGS. 26A and 26B are flowcharts showing feed operation control processing.
Figure 26B:
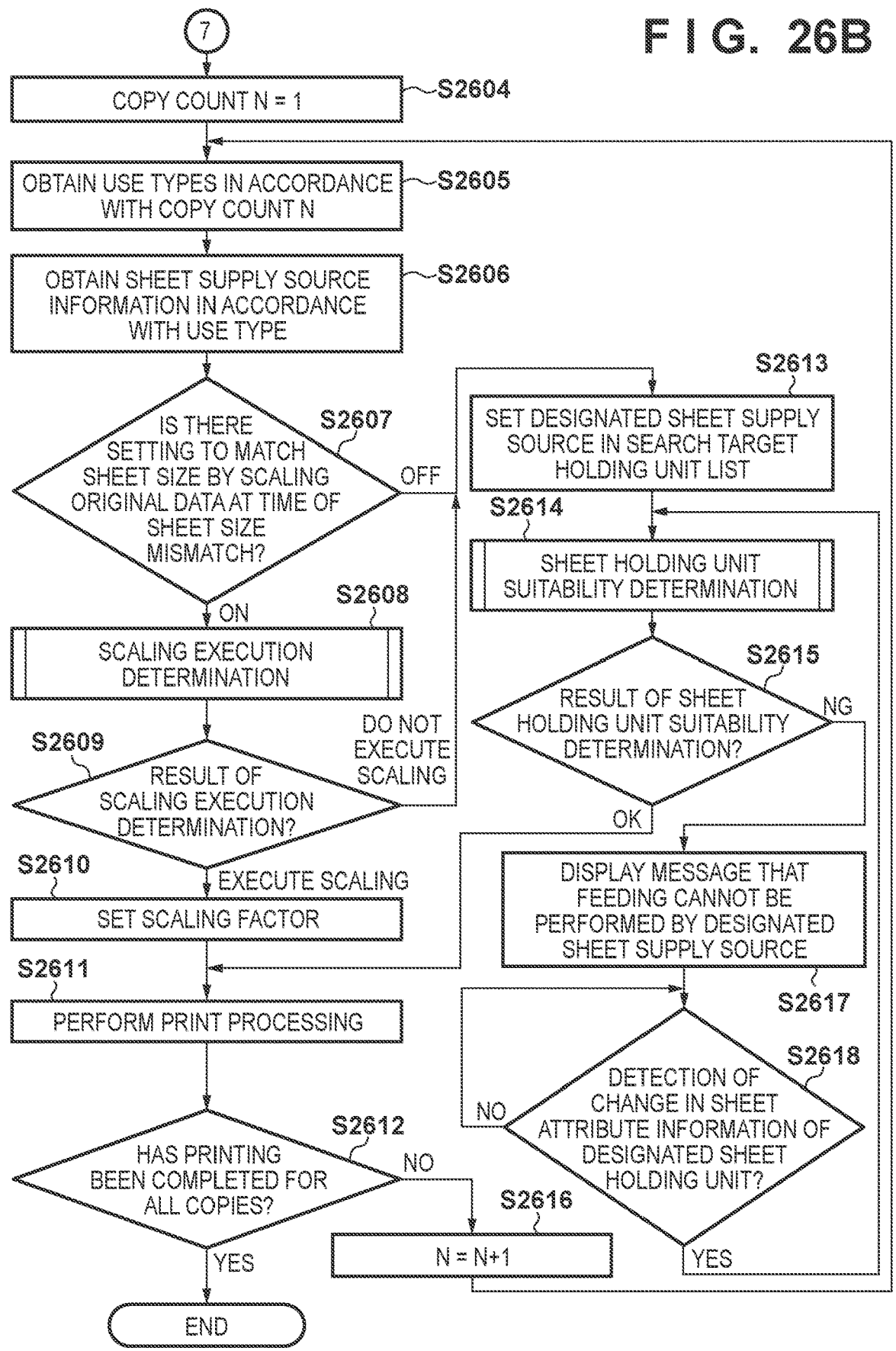

FIGS. 26A and 26B are flowcharts showing processing to control a feed operation by comparing the sheet set in a PDL job and the sheet of the sheet supply source at the execution of the PDL job in which the sheet supply sources are switched in accordance with the respective use types. The processes of steps S2601 to S2606 are the same as those of steps S1001 to S1006 of FIG. 10, and a description there of will be omitted.

In step S2607, a CPU 111 determines whether the setting, which is set by using a screen 2300, to execute printing by scaling the original data at the time of sheet size mismatch has been set to "ON". If it is determined that the setting is set to "ON", the process advances to step S2608. Otherwise, the process advances to step S2613.

In step S2608, the CPU 111 determines whether scaling is necessary by comparing the sheet size set in the job and the sheet size set in the sheet supply source. This determination is performed by referring to the values of the variables of a scaling execution determination result. In step S2609, the process is switched to the next process in accordance with the determination result. If the scaling execution determination result indicates that execution of scaling is necessary, the process advances to step S2610. On the other hand, if the scaling execution determination result indicates that execution of scaling is not necessary, the process advances to step S2613. In step S2610, the CPU 111 obtains a scaling factor based on the sheet size set in the job and the sheet size of the sheet supply source and sets a scaling factor. For example, "the sheet size of the sheet supply source÷ the sheet size set in the job" is calculated as the scaling factor.

In step S2611, the CPU 111 performs image printing processing corresponding to the sheet attribute information. If the scaling factor has been set in step S2610, the CPU 111 performs scaling and image printing processing. Processes of step S2612 and subsequent steps are the same as those of step S2211 and subsequent steps in FIGS. 22A and 22B, and a description thereof will be omitted.

As described above, according to this embodiment, even if the sheet sizes do not match when the sheet supply source is to be switched for each use type, scaling processing is executed by matching the original image data to the sheet size of the sheet holding unit. As a result, printing can be performed without stopping before the feed operation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-136441, filed Jul. 12, 2017 and No. 2018-113103, filed Jun. 13, 2018 which are hereby incorporated by reference herein in their entirety.

What is claimed is:

1. An image forming apparatus comprising:
a first sheet storage;
a second sheet storage;
a printer that prints an image on a sheet; and
a controller that executes a print job in which the first sheet storage is designated for printing a first copy and the second sheet storage is designated for printing a second copy, and a sheet attribute is designated and causes the printer to print the image on the sheet,
wherein the controller determines, based on whether a sheet storage for which a sheet attribute different from the sheet attribute designated in the print job is set is the first sheet storage designated for printing the first copy, whether to stop the execution of the print job,
wherein the controller determines, on the basis that a sheet storage for which a sheet attribute different from the sheet attribute designated in the print job is set is the first sheet storage designated for printing the first copy, to stop the execution of the print job, and
wherein the controller determines, on the basis that a sheet storage for which a sheet attribute different from the sheet attribute designated in the print job is set is the second sheet storage designated for printing the second copy, to continue the print job using the second sheet storage without receiving, after starting to execute the print job, a user instruction for continuing the execution of the print job.

2. The image forming apparatus according to claim 1, wherein, in a case where the controller determines, on the basis that a sheet storage for which a sheet attribute different from the sheet attribute designated in the print job is set is the second sheet storage designated for printing the second copy, to continue the print job, the controller executes the print job and causes the printer to print the image on the sheet conveyed from the first sheet storage and to print the image on the sheet conveyed from the second sheet storage.

3. The image forming apparatus according to claim 1, wherein the sheet attribute is a sheet size.

4. The image forming apparatus according to claim 1, wherein, in the print job, the first sheet storage is designated to be used for printing an original copy and the second sheet storage is designated to be used for printing a duplicate copy.

5. The image forming apparatus according to claim 1, further comprising:
a network interface that receives the print job from an external apparatus,
wherein the controller executes the received print job and causes the printer to print the image on the sheet.

6. A method for controlling an image forming apparatus including a first sheet storage and a second sheet storage and a printer that prints an image on a sheet, the method comprising:
executing a print job in which the first sheet storage is designated for printing a first copy and the second sheet storage is designated for printing a second copy, and a sheet attribute is designated and causes the printer to print the image on the sheet;
determining, based on whether a sheet storage for which a sheet attribute different from the sheet attribute designated in the print job is set is the first sheet storage designated for printing the first copy, whether to stop the execution of the print job;
determining, on the basis that a sheet storage for which a sheet attribute different from the sheet attribute designated in the print job is set is the first sheet storage designated for printing the first copy, to stop the execution of the print job, and
determining, on the basis that a sheet storage for which a sheet attribute different from the sheet attribute designated in the print job is set is the second sheet storage designated for printing the second copy, to continue the print job using the second sheet storage without receiving, after starting to execute the print job, a user instruction for continuing the execution of the print job.

* * * * *